(12) United States Patent
Tan et al.

(10) Patent No.: US 9,712,257 B1
(45) Date of Patent: Jul. 18, 2017

(54) DIGITALLY-CONTROLLED IMPEDANCE CONTROL FOR DYNAMICALLY GENERATING DRIVE STRENGTH FOR A TRANSMITTER

(71) Applicant: Xilinx, Inc., San Jose, CA (US)

(72) Inventors: Sing Keng Tan, San Jose, CA (US); David S. Smith, Redwood City, CA (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 15/236,065

(22) Filed: Aug. 12, 2016

(51) Int. Cl.
*H03K 19/003* (2006.01)
*H04B 14/04* (2006.01)
*H04B 3/04* (2006.01)

(52) U.S. Cl.
CPC ............... *H04B 14/04* (2013.01); *H04B 3/04* (2013.01)

(58) Field of Classification Search
CPC .................................. H04B 14/04; H04B 3/04
See application file for complete search history.

(56) References Cited

U.S. PATENT DOCUMENTS

| | | | |
|---|---|---|---|
| 6,445,245 B1 | 9/2002 | Schultz et al. | |
| 8,018,250 B1 | 9/2011 | Klein et al. | |
| 8,560,294 B1 | 10/2013 | Ren et al. | |
| 2005/0012533 A1* | 1/2005 | Aoyama | H04L 25/0278 327/170 |
| 2005/0040845 A1* | 2/2005 | Park | H03K 19/0005 326/30 |
| 2007/0296470 A1* | 12/2007 | Hayashi | H03K 19/018585 327/108 |
| 2016/0218896 A1* | 7/2016 | Fiedler | H03K 19/0005 |

\* cited by examiner

*Primary Examiner* — Dac Ha
(74) *Attorney, Agent, or Firm* — W. Eric Webostad

(57) ABSTRACT

An apparatus, and method therefor, relates generally to a transmitter. In such an apparatus, a decoder is configured to receive a data input and control signals and to generate state signals responsive to a control signal of the control signals and data polarity the data input. Select circuitry is configured to receive coded signals to replace the data input with a pull-up code and a pull-down code of the coded signals responsive to the state signals and the control signals for propagation of the pull-up code and the pull-down code in place of the data input.

20 Claims, 19 Drawing Sheets

| Decoder 190 | | in_data 17, in_data_fir 18 | | | | 
|---|---|---|---|---|---|
| | | 00 | 01 | 11 | 10 |
| tri_state_b 197, en_TX_fir 191 | 00 | is_tristate_odt 215 | is_tristate_odt 215 | is_tristate_odt 215 | is_tristate_odt 215 |
| | 01 | is_tristate_odt 215 | is_tristate_odt 215 | is_tristate_odt 215 | is_tristate_odt 215 |
| | 11 | is_StrongLo 211 | is_WeakLo 212 | is_StrongHi 213 | is_WeakHi 214 |
| | 10 | is_StrongLo 211 | is_StrongLo 211 | is_StrongHi 213 | is_StrongHi 213 |

Decoder Truth Table 200

Tri-State Mode 201
TX with FIR Mode 202
TX without FIR Mode 203
State Signals 199

FIG. 6

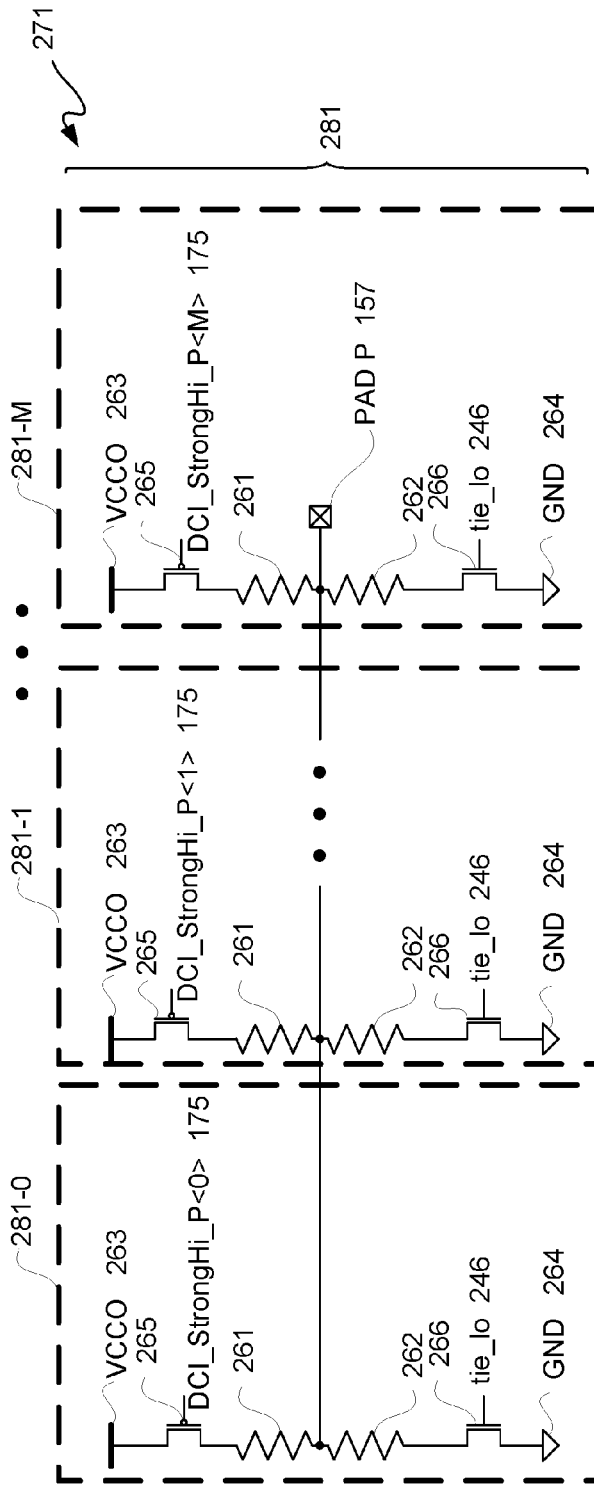
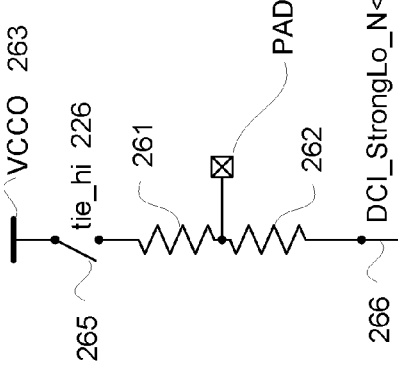
FIG. 9A
FIG. 9B

DIGITALLY-CONTROLLED IMPEDANCE CONTROL FOR DYNAMICALLY GENERATING DRIVE STRENGTH FOR A TRANSMITTER

FIELD OF THE INVENTION

The following description relates to integrated circuit devices ("ICs"). More particularly, the following description relates to digitally-controlled impedance control for dynamically generating drive strength for a transmitter for an IC.

BACKGROUND

Transmission of signals off-chip is conventionally provided by one or more on-chip transmitters and/or output buffers. However, in order to support multiple protocols, both single-ended and differential, such transmitters and output buffers have become more complicated consuming more circuit resources. Hence, it is desirable and useful to provide a less complex transmitter or output buffer.

SUMMARY

An apparatus relates generally to a transmitter. In such an apparatus, a decoder is configured to receive a data input and control signals and to generate state signals responsive to a control signal of the control signals and data polarity the data input. Select circuitry is configured to receive coded signals to replace the data input with a pull-up code and a pull-down code of the coded signals responsive to the state signals and the control signals for propagation of the pull-up code and the pull-down code in place of the data input.

Another apparatus relates generally to a transmitter. In such an apparatus, a digitally-controlled impedance control circuit is configured to receive data pairs and control information with coded signals and configured to generate state signals responsive to the data pairs and the control information. The coded signals are associated with the data pairs. The digitally-controlled impedance control circuit is configured to selectively output an internal pull-up code and an internal pull-down code from the coded signals. A level shifter circuit is configured to level-shift the internal pull-up code and the internal pull-down code. A pre-driver circuit is configured to buffer the internal pull-up code and the internal pull-down code. A driver circuit is configured to dynamically generate drive strength responsive to the internal pull-up code and the internal pull-down code.

A method relates generally to transmission. In such a method, a first data input, a second data input, and control signals are received by a decoder. First coded signals are received by first select circuits. Second coded signals are received by second select circuits. State signals are generated by the decoder responsive to the first data input, the second data input, and at least one of the control signals. An internal pull-up code of the first coded signals and an internal pull-down code of the second coded signals are selectively output responsive to the control signals and the state signals.

Other features will be recognized from consideration of the Detailed Description and Claims, which follow.

BRIEF DESCRIPTION OF THE DRAWINGS

Accompanying drawings show exemplary apparatus(es) and/or method(s). However, the accompanying drawings should not be taken to limit the scope of the claims, but are for explanation and understanding only.

FIG. 6 is a table diagram illustratively depicting an exemplary truth table for a decoder of the TX-DCI control circuit for FIG. 5.

FIGS. 9A through 9F are respective schematic diagrams illustratively depicting an exemplary leg circuit of a driver circuit of the VMTX of FIG. 3 in respective configurations.

DETAILED DESCRIPTION

Figure 1:
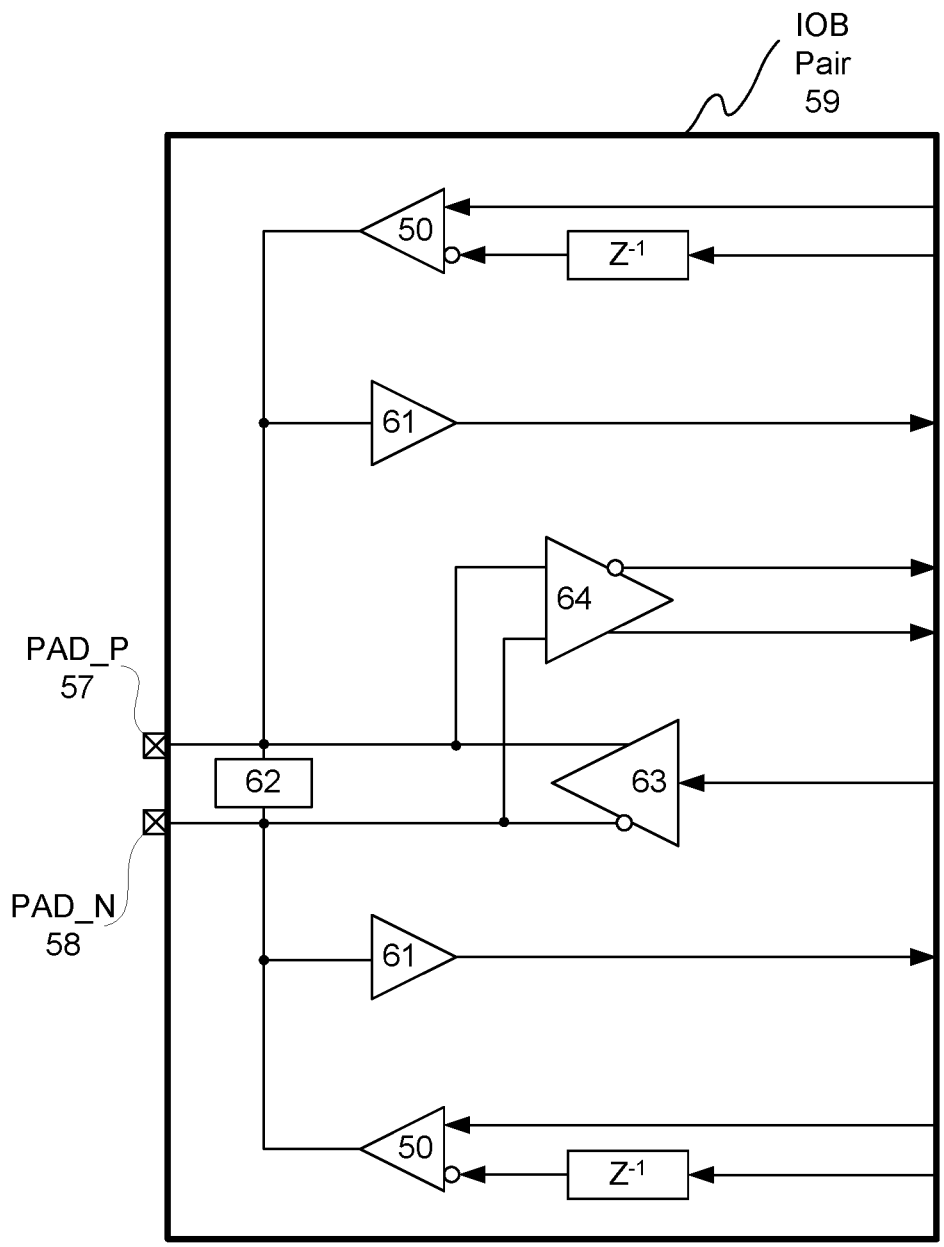
FIG. 1 is a block diagram illustratively depicting an exemplary conventional input/output block ("IOB") pair.

In the following description, numerous specific details are set forth to provide a more thorough description of the specific examples described herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same number labels are used in different diagrams to refer to the same items; however, in alternative examples the items may be different.

Exemplary apparatus(es) and/or method(s) are described herein. It should be understood that the word "exemplary" is used herein to mean "serving as an example, instance, or illustration." Any example or feature described herein as "exemplary" is not necessarily to be construed as preferred or advantageous over other examples or features.

As semiconductor process technology continues to yield smaller and smaller device sizes, "IO" devices and VCCAUX_IO internal supplies may not scale down as readily as "core" devices and VCCINT_IO internal supplies. By core devices, it is generally meant devices, such as transistors, of an IC which are generally used for logic and other gating applications in which thinner gate dielectrics and/or shorter minimum channel lengths are used as compared to IO devices of such an IC. Thus, by reducing the number of IO devices operating in a VCCAUX_IO domain, less semiconductor area may be consumed as core devices are generally smaller than IO devices of an IC. As described below in additional detail, a DCI circuit of a multi-leg voltage mode transmitter ("VMTX") may be operated in a VCCINT_IO power supply domain with core devices to reduce VMTX semiconductor area and/or to reduce IO pad capacitance.

Moreover, segmentation between post-cursor and main-cursor drivers may be avoided in a multi-leg VMTX as described below. Along those lines, finite impulse response ("FIR") equalization may be implemented without having a driver dedicated as a main-cursor driver and another driver dedicated as a post-cursor driver as in a multi-segment VMTX. In view of this architectural distinction, multiple segments need not be used and multiple data paths per segment need not be used. This architectural difference may be used in realizing greater granularity for FIR equalization by having driver drive strength changed dynamically responsive to polarities of incoming data. Along those lines, a "dynamic FIR equalization" may be implemented as codes associated with data polarities of incoming data, and such codes may be propagated downstream to reflect real-time changes to driver drive strength. Along those lines, FIR equalization level may be fixed based on the combination of driver drive strengths which are change dynamically.

As will become apparent from the following description, a multi-leg VMTX as described below may be configured, such as programmed by programming configuration memory cells of an FPGA, to support multiple single-ended TX topologies, including Pseudo Open Drain ("POD") and Series Stub Termination Logic ("SSTL"), among others. Moreover, by using a pair of multi-leg VMTXs as described below, such pair of multi-leg VMTXs may be configured to support multiple differential TX protocols, including Low Voltage Differential Swing ("LVDS") and SUB-LVDS TX, among others. In addition for use in an IOB or transceiver, a multi-leg VMTX driver may be suspended for use as on-die termination ("ODT") while in a receive mode.

Figure 2:
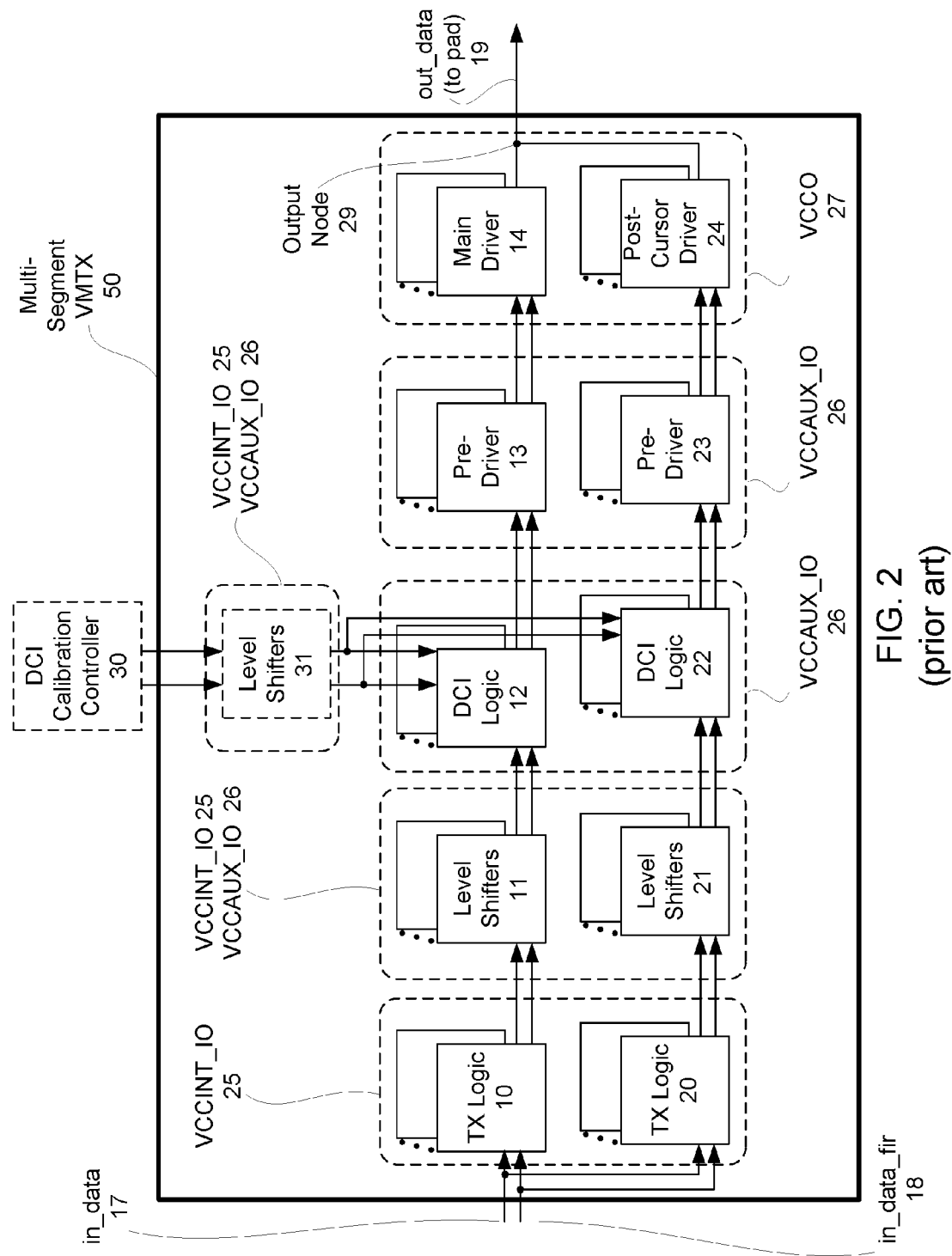
FIG. 2 is a block diagram illustratively depicting an exemplary multi-segment voltage mode transmitter ("VMTX").

A general introduction is provided with reference to FIGS. 1 and 2 to further understanding before describing the examples illustratively depicted in the several figures following FIG. 2.

FIG. 1 is a block diagram illustratively depicting an exemplary conventional input/output block ("IOB") pair 59. IOB pair 59 may be programmed to support one or more single-ended transmitters or receivers or to support a differential transmitter or receiver. In this particular example, IOB pair 59 includes two multi-segment voltage mode transmitters ("VMTXs") 50, two single-ended receivers ("RXs") 61, an internal differential termination 62 (e.g., a resistor), a current-mode differential transmitter ("TX") 63, and a differential receiver ("RX") 64.

IOB pair 59 may be coupled to input/output pads 57 and 58, namely respectively a positive-side or positive-polarity ("P") coupled pad and a negative-side or negative-polarity ("N") pad. As IOB pair 59 is well known, it is not described hereinbelow in unnecessary detail for purposes of clarity.

FIG. 2 is a block diagram illustratively depicting an exemplary multi-segment VMTX 50 previously known and commonly owned by the assignee hereof. Optionally, a digitally-controlled impedance ("DCI") calibration controller 30 may be coupled to one or more VMTXs 50.

VMTX 50 includes multiple segments, and each such segment includes two data paths, namely an "upper data path" and a "lower data path". In this example, an "upper data path" of a segment includes TX logic 10, level shifters 11, DCI logic 12, pre-driver 13, and main driver 14. In this example, a "lower data path" of such a segment includes TX logic 20, level shifters 21, DCI logic 22, pre-driver 23, and post-cursor driver 24.

Input data 17 and finite impulse response ("FIR") input data 18 may be provided to both upper and lower data paths. FIR input data 18 may be input data 17 inverted and delayed by one unit interval ("UI"). Each of TX logic 10 and 20 receives both input data 17 and 18. TX logic 10 and 20 may be biased with an internal input/output voltage level 25, referred to herein as a "VCCINT_IO" level, for such a power domain or supply voltage domain. TX logic 10 may be used to configure main driver 14 or to disabled same. TX logic 20 may be used to configure post-cursor driver 24 or disabled same. Along those lines, multiple segments of multi-segmented VMTX 50 may be used to provide output data 19, which may involve disabling one or more main drivers 14 and/or one or more post-cursor drivers 24 of such segments used.

Input data 17 and 18 may be propagated to level shifters 11 and 21 respectively from TX logic 10 and 20. Level shifters 11 and 21 may be used to increase bias voltage, such as for input data 17 and 18, from internal input/output voltage level 25 up to an auxiliary internal input/output voltage level 26, referred to herein as "VCCAUX_IO." Level-shifted input data 17 and 18 may be provided from level shifters 11 and 21 to DCI logic 12 and 22 operated in an auxiliary internal input/output voltage level 26 power domain or supply voltage domain.

DCI logic 12 and 22 may be calibrated by optional DCI calibration controller 30, and calibration outputs of DCI calibration controller 30 may be provided to optional level shifters 31 for shifting from internal input/output voltage level 25 to auxiliary internal input/output voltage level 26. Level-shifted calibration outputs from level-shifters 31 may be provided to DCI logic 12 and 22.

DCI logic 12 and 22 may be used to preconfigure drive strengths of drivers of a segment. DCI logic 12 may be used to configure drive strength of main driver 14 of a segment, and DCI logic 22 may be used to configure drive strength of post-cursor driver 24 of a segment. For clarity, known control signaling from TX logic 10 and 20 respectively for main driver 14 and post-cursor driver 24 is not illustratively depicted.

DCI logic 12 may be used to configure main driver 14 to a drive strength of approximately 240 ohms. Different numbers of segments of VMTX 50 may be used to obtain different drive strengths, as multiple main drivers 14 of upper data paths may be used to drive a signal to a common output node 29 of VMTX 50 from which single-ended output data 19 may be sourced. However, main driver 14 and/or post-cursor driver 24 drive strengths are preset for incoming input data 17 and 18 propagated to such drivers.

Input data 17 and 18 may be passed to pre-drivers 13 and 23 for buffering to an auxiliary internal input/output voltage level 26 prior to input to main driver 14 and post-cursor driver 24. Main driver 14 and post-cursor driver 24 may be biased to an external input/output voltage level 27 for communication off-chip with respect to an IC in which VMTX 50 is located. External input/output voltage level 27, which is referred to herein as "VCCO", may be a bias voltage level for output of output data 19 to an output pad or input/output pad of an IC. Voltage levels 26 and 27 may be the same; however, power associated with these two different power domains may be different. Current drawn in a VCCO power domain depends in part on VCCO voltage level. For example, an auxiliary internal input/output voltage level 26 may be fix at 1.8V, but an external input/output voltage level 27 may be set based on an IO standard or protocol. Generally, an external input/output voltage level 27 is in a range from approximately 1.0V to 1.8V for some IO standards. If, for example, an external input/output voltage level 27 is at 1.0V, current consumption in a power domain of such an external input/output voltage level 27 may be less than current consumption in an auxiliary internal input/output voltage level 26 fix at 1.8V. It should be understood that the acronym "VCC" as used herein, including for example VCCO and VCCAUX, is not related to bipolar transistors, but rather is a voltage level used by many for describing external and internal voltage levels of MOSFET devices, as is known.

For TX FIR equalization, both upper and lower data paths of multiple segments may be used together. By having a main driver 14 on an upper data path and a post-cursor driver 24 on a lower data path, an FIR equalization level may be determined by a ratio of main and post-cursor driver's drive strengths.

Along those lines, granularity of an equalization level is restricted by the number of driver segments in a multi-segment VMTX that may be used to obtain such an equalization level. As described below, a multi-leg VMTX may be implemented with substantially less circuitry overhead than a multi-segment VMTX and with multiple drivable legs in a single driver to provide enhanced granularity with less circuitry overhead.

Also, having to use a current-mode differential TX 63 increases area usage, and so by using a multi-leg VMTX, as described in additional detail below, such a current-mode differential TX 63 may be omitted in an IOB pair. As described below in additional detail, two multi-leg VMTXs may be used to support differential TX protocols previously supported by current-mode differential TX 63.

With the above general understanding borne in mind, various configurations for multi-leg VMTXs are generally described below.

Figure 3:
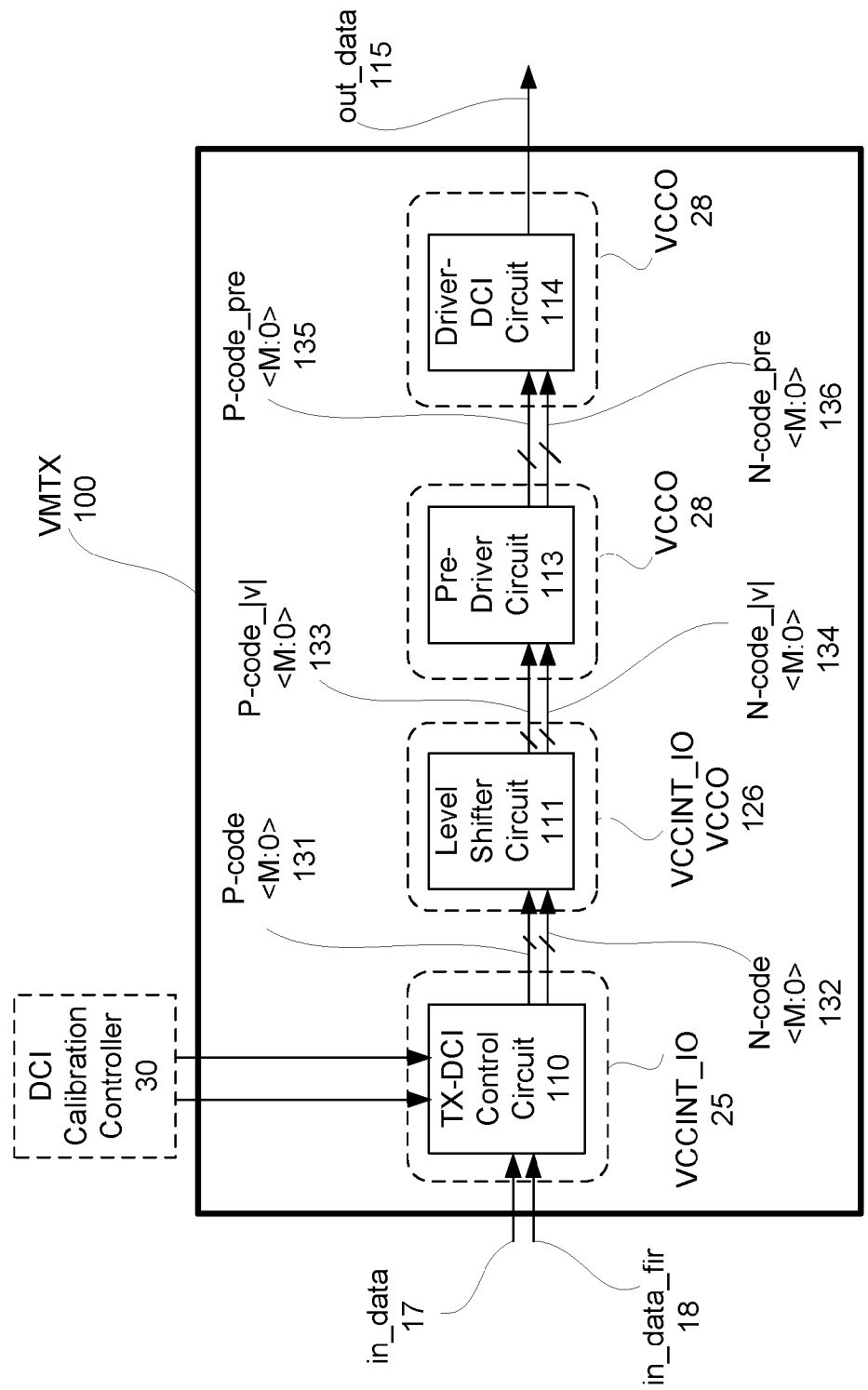
FIG. 3 is a block diagram illustratively depicting an exemplary multi-leg VMTX.

FIG. 3 is a block diagram illustratively depicting an exemplary multi-leg VMTX 100. Optionally, a conventional DCI calibration controller 30 may be coupled to one or more VMTXs 100 for calibration of TX-DCI control circuit 110.

VMTX 100 may consist of single instances of a TX-DCI control circuit 110, level shifter circuit 111, pre-driver circuit 113, and driver-DCI circuit 114. Driver-DCI circuit ("driver circuit") 114 may be implemented with multiple drivable output impedance circuits ("legs"), such as "pull-up legs" and "pull-down legs." Driver circuit 114 need not have a preset drive strength, such as for a main-cursor driver for example. Moreover, for driver circuit 114 there need not be any delineation between precursor, post-cursor and main-cursor drivers. Selective use of driver legs may be programmable or otherwise configurable through application of DCI codes in order to provide any of a variety of drive strengths. As described below in additional detail, such DCI codes in effect are finite impulse response equalization codes, where such DCI codes may be selected responsive to polarity of data.

Though the following description generally assumes an implementation of a binary weighting of such legs, such legs may be implemented with a thermometer weighting or a combination of a thermometer and binary weighting. Again, as described below in additional detail, pull-up legs and pull-down legs may be programmed or otherwise configured to provide a drive strength with enhanced granularity using DCI codes.

TX-DCI control circuit 110 is a digitally-controlled impedance control circuit configured to receive a first data input 17 and a second data input 18, as well as later described control signals, first coded signals for pull-up legs, and second coded signals for pull-down legs. TX-DCI control circuit 110 may be configured to generate state signals responsive to polarities of first data input 17 and second data input 18, as well as states of a subset of such control signals. First data input 17 may be an input signal, and second data input 18 may be an inverted and delayed version of first data input 17. Second data input 18 may be used when FIR equalization is used. However, FIR equalization need not be used, and in such instances, first data input 17 may be used without any second data input 18.

In an implementation for FIR equalization, second data input 18 may be delayed one, or at least approximately one, unit interval ("UI") with respect to first data input 17. In terms of data transmission, a UI is generally a pulse time or symbol duration time. For example, a UI may be an interval in a data stream used for a pulse or symbol before a next UI is taken up for a next pulse or symbol. With respect to a digital bitstream for a data input, a UI may be a bit time, namely a time interval used to transmit one bit. For purposes of clarity by way of example and not limitation, it shall be assumed that first data input 17 is a digital bitstream formed of data having a polarity equal to either logic 1 or logic 0. Thus, second data input 18 is a digital bitstream formed of the same data having opposite polarity of corresponding data in first data input 17 and delayed one bit position for FIR equalization.

For a non-limiting example, for first data input 17 being . . . 100011000 . . . , corresponding second data input 18 would be . . . 011100111 . . . ; however, data polarity pairs for such data inputs 17 and 18 input to a VMTX 100 in this example would be . . . 1d, 00, 01, 01, 11, 10, 00, 01, d1 . . . , where "d" is used to indicate a delay placeholder in place of a bit value to indicate a no corresponding bit listed for purposes of clarity and not limitation. Along those lines, if a string of polarity 1's or a string of polarity's 0 is followed by a bit of opposite polarity, then more drive strength is respectively used for a pull-down or pull-up operation. Likewise, if a string of toggling bit polarities is followed by one or more bits of the same polarity, less drive strength is used for a pull-up or pull-down operation than if following a string of bits of opposite polarity as in the prior example. Furthermore, if there is no change in state from one bit to the next, then both pull-up and pull-down strength are low. Generally, if two or more consecutive bits are of the same polarity, then the second bit or the rest of the consecutive bits use less drive strength. For example, if the bit sequence is 10100000, the first four bits [1010] of this sequence use more drive strength than the fifth to eight bits [0000].

Along the above lines, it should be appreciated that an output line has an associated output capacitance. If this output capacitance is fully charged due to a string of logic high pulses for example, then discharging such line capacitance in a short amount of time takes more energy. Conversely, if this output capacitance is fully discharged due to a string of logic low pulses for example, then charging such line capacitance in a short amount of time takes more energy.

With this understanding of drive strength for pull-up and pull-down operations, the following states of data polarity for first data input 17 alone and for pairs for first data input 17 and second data input 18 may be used to code conditions. What is termed as a "StrongLo" condition exists when state of first data input 17 is polarity 0 for non-FIR equalization. What is termed as a "StrongHi" condition exists when state of first data input 17 is polarity 1 for non-FIR equalization. For FIR equalization, what is termed as a "StrongLo" condition exists when state of first data input 17 is polarity 0 and a corresponding state, namely in a same UI slot or at a same input time interval, second data input 18 is polarity 0. What is termed as a "WeakLo" condition exists when state of first data input 17 is polarity 0 and a corresponding state of second data input 18 is polarity 1 for FIR equalization. What is termed as a "WeakHi" condition exists when state of first data input 17 is polarity 1 and a corresponding state of second data input 18 is polarity 0 for FIR equalization. What is termed as a "StrongHi" condition exists when state of first data input 17 is polarity 1 and a corresponding state of second data input 18 is polarity 1 for FIR equalization.

Figure 4:
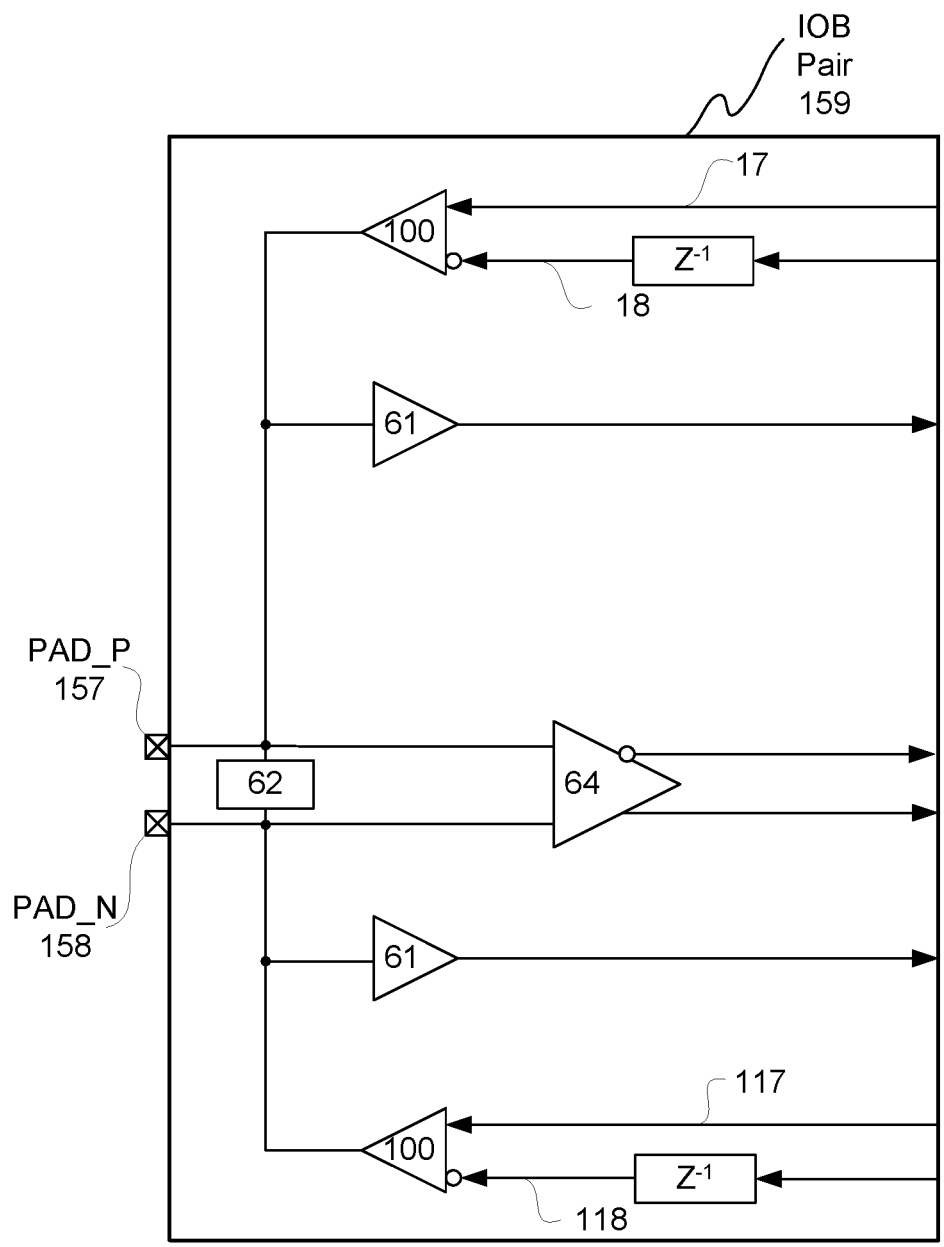
FIG. 4 is a schematic diagram illustratively depicting an exemplary IOB pair for the VMTX of FIG. 3.

FIG. 4 is a schematic diagram illustratively depicting an exemplary IOB pair 159. IOB pair 159 may be of an IC, such as an FPGA or any other IC having an I/O buffer.

IOB pair 159 may include a pair of multi-leg VMTXs 100. In this example, an upper multi-leg VMTX 100 has an input interface configured for receiving input data 17 and input data 18, and a lower multi-leg VMTX 100 has an input interface configured for receiving input data 117 and input data 118. Input data 117 and 118 may correspond to input data 17 and 18 as differential signaling counter parts, or input data 117 and 118 may be for separate single-ended signaling use. Output of upper multi-leg VMTX 100 is coupled to a positive-side I/O pad ("PAD_P") 157, and output of lower multi-leg VMTX 100 is coupled to a negative-side I/O pad ("PAD_N") 158.

Pads 157 and 158 may be used in combination for differential transmission or reception signaling. For single-ended transmission or reception, either of pads 157 or 158 may be used, and correspondingly either of multi-leg VMTXs 100 and either of single-ended RXs 61 may be used.

An internal differential termination 62 may be coupled between pads 157 and 158 for differential transmission or reception. For differential reception, an input interface of differential RX 64 may be coupled to pads 157 and 158 for providing a received differential input internally to an IC in which IOB pair 159 is located. An upper RX 61 may have an input interface coupled to pad 157, and a lower RX 61 may have an input interface coupled to pad 158. RXs 61 may be used in combination for differential reception. Along those lines, different types of differential reception may be supported either with a pair of RXs 61 or a differential RX 64.

For single-ended transmission, either of multi-leg VMTXs 100 may be used, and for differential transmission, multi-leg VMTXs 100 may be used together. Accordingly, a current-mode differential TX 63 of an IOB pair 59 of FIG. 1 may be omitted to save on semiconductor area, as well as to reduce overall IO pad capacitance.

Even though one or more multi-leg VMTXs 100 is described in terms of the context of an IOB pair, use of a multi-leg VMTX 100 is not limited to such context. For example, one or more multi-leg VMTX 100 may be used for or in an output interface of an IC for single-ended and/or differential signaling.

Returning to FIG. 3, data input ("in_data") 17 and data input ("in_data_fir") 18 may be input to TX-DCI control circuit 110. For purposes of clarity by way of example and not limitation, it shall be generally assumed that FIR equalization is used, unless expressly indicated otherwise.

Again, TX-DCI control circuit 110 may be configured to receive data inputs 17 and 18, control signals, first coded signals for pull-up legs, and second coded signals for pull-down legs. TX-DCI control circuit 110 may be configured to generate state signals responsive to polarities of data inputs 17 and 18 and a subset of such control signals. Responsive to such state signals TX-DCI control circuit 110 may output signal bus of positive-side and negative-side of coded signal buses, namely P-code <M:0> signal 131 and N-code <M:0> signal 132 for M a positive integer greater than zero. Even though parallel signals are illustratively depicted in FIG. 3 for associated signal buses, for purposes of clarity and not limitation, individual lines may represent serial or parallel signal buses in other figures herein.

Figure 5:
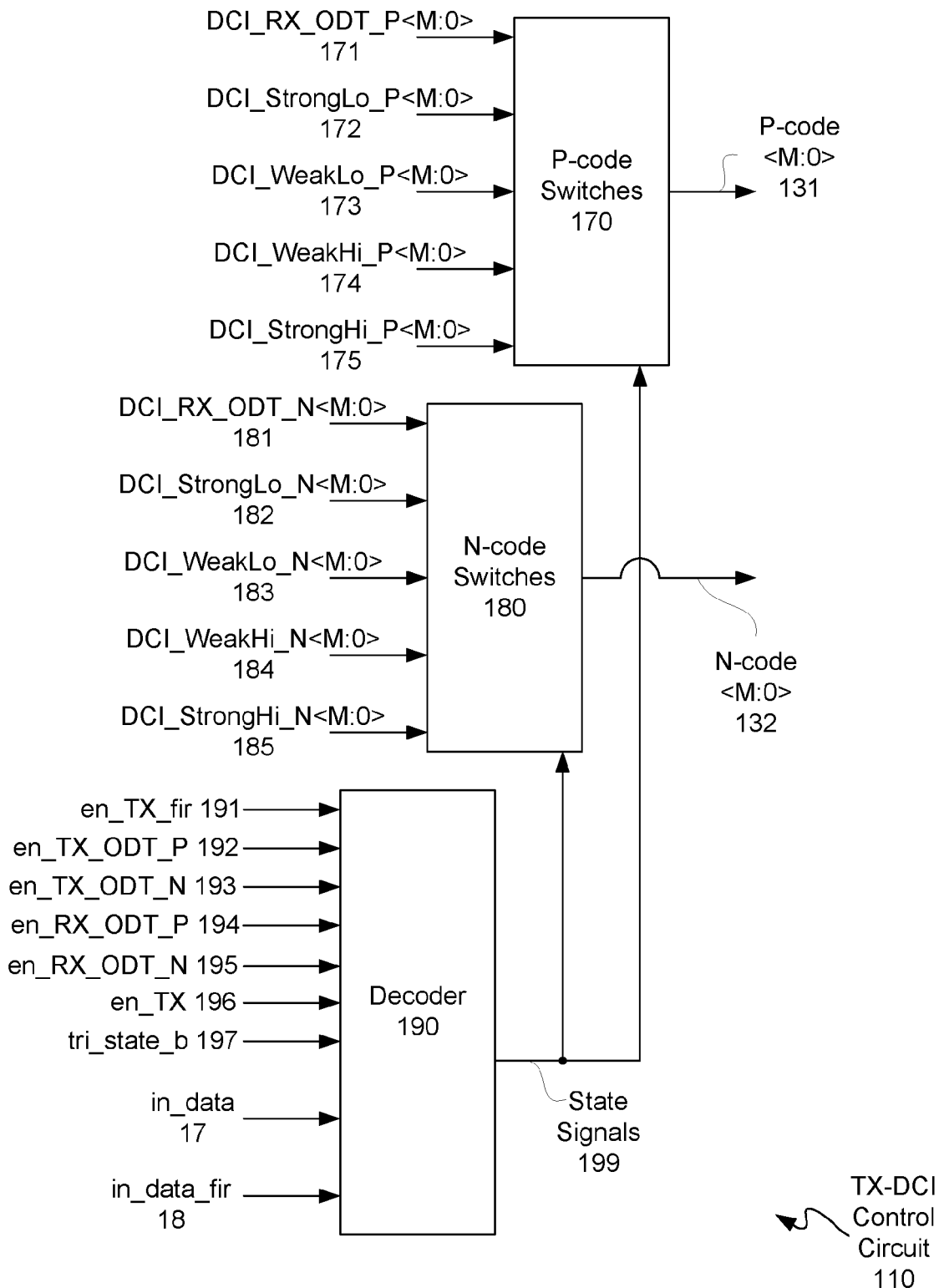
FIG. 5 is a block diagram illustratively depicting an exemplary transmitter-digitally controlled impedance ("TX-DCI") control circuit for the VMTX of FIG. 3.

FIG. 5 is a block diagram illustratively depicting an exemplary TX-DCI control circuit 110. TX-DCI control circuit 110 includes a decoder 190, pull-down side code ("N-code") switches 180, and pull-up side code ("P-code") switches 170. Coded signals 171 through 175 and coded signals 181 through 185 may be associated with polarities of data pairs of data inputs 17 and 18.

Coded signals 171 through 175 and coded signals 181 through 185 are respectively provided to P-code select circuits ("switches") 170 and N-code select circuits ("switches") 180. Each of coded signals 171 through 175 and 181 through 185 may be M+1 bits wide. Control signals 191 through 197, as well as data inputs 17 and 18, may be provided to decoder 190.

Control signals provided to decoder 190 may include a voltage mode transmission activation signal ("en_TX") 196, a FIR activation signal ("en_TX_fir") 191, a positive polarity transmitter-side ODT activation signal ("en_TX_ODT_P") 192, a negative polarity transmitter-side ODT activation signal ("en_TX_ODT_N") 193, a positive polarity receiver-side ODT activation signal ("en_RX_ODT_P") 194, a negative polarity receiver-side ODT activation signal ("en_RX_ODT_N") 195, and a driver suspension (complemented or bar) signal ("tri_state_b") 197. In this example implementation, driver suspension signal 197 is active low.

Control signals 191, 192, 194, and 196 may be provided from decoder 190 or directly to P-code switches 170, as described below in additional detail. Likewise, control signals 191, 193, 195, and 196 may be provided from decoder 190 or directly to N-code switches 180, as described below in additional detail. Accordingly, control signals 191 and 196 may be provided to both sets of switches 170 and 180. Decoder 190 may be configured to output state signals 199 to P-code switches 170 and N-code switches 180. P-code switches 170 and N-code switches 180 may be configured to respectively selectively output a P-code signal 131 and an N-code signal 132.

Coded signals 171 through 175 respectively are DCI_RX_ODT_P<M:0>171, DCI_StrongLo_P<M:0>172, DCI_WeakLo_P<M:0>173, DCI_WeakHi_P<M:0>174, and DCI_StrongHi_P<M:0>175. DCI_RX_ODT_P<M:0>171 may be selected for a reception mode for output as P-code signal 131, when operation of VMTX 100 is effectively suspended in favor of setting switches of a driver circuit 114 for a positive polarity receiver-side termination impedance. For a transmission mode, any one of DCI_StrongLo_P<M:0>172, DCI_WeakLo_P<M:0>173, DCI_WeakHi_P<M:0>174, or DCI_StrongHi_P<M:0>175 may be selected by P-code switches 170 for output as P-code signal 131.

Coded signals 181 through 185 respectively are DCI_RX_ODT_N<M:0>181, DCI_StrongLo_N<M:0>182, DCI_WeakLo_N<M:0>183, DCI_WeakHi_N<M:0>184, and DCI_StrongHi_N<M:0>185. DCI_RX_ODT_N<M:0>181 may be selected for a reception mode for output as N-code signal 132, when operation of VMTX 100 is effectively suspended in favor of setting switches of a driver circuit 114 for a negative polarity receiver-side termination impedance. For a transmission mode, any one of DCI_StrongLo_N<M:0>182, DCI_WeakLo_N<M:0>183, DCI_WeakHi_N<M:0>184, or DCI_StrongHi_N<M:0>185 may be selected by N-code switches 180 for output as N-code signal 132.

Bit settings for setting bits M to 0 may vary as between P-coded signals 171 through 175, as may vary depending upon implementation resistances of M+1 positive-side polarity legs for supporting different transmission and reception protocols. Likewise, bit settings for setting bits M to 0 may vary as between N-coded signals 181 through 185, as may vary depending upon implementation resistances of M+1 negative-side polarity legs for supporting different transmission and reception protocols. Moreover, for a non-transceiver context, P-coded signal 171 and N-coded signal 181 may be omitted from such sets of coded signals. It should be understood that having M+1 driver legs on each side may or may not be for symmetrical pull-up and pull-down configurations. Moreover, though M+1 driver legs are on both pull-up and pull-down sides, in other implementations unequal numbers of driver legs for pull-up and pull-down sides may be used.

TX-DCI control circuit 110 is configured to selectively output an internal pull-up code as P-code signal 131 and an internal pull-down code as N-code signal 132 respectively from P-coded signals 172 through 175 and N-coded signals 182 through 185 responsive to state signals 199, as well as a subset of control signals as described below in additional detail. For a VMTX 100 used in a transceiver, such as an IOB, TX-DCI control circuit 110 is configured to selectively output an internal pull-up code as P-code signal 131 and an internal pull-down code as N-code signal 132 respectively from P-coded signals 171 through 175 and N-coded signals 181 through 185 responsive to state signals 199, as well as a subset of control signals as described below in additional detail.

FIG. 6 is a table diagram illustratively depicting an exemplary truth table 200 for decoder 190 of FIG. 5. Columns in truth table 200 are for polarity states of data inputs 17 and 18, and rows in truth table 200 are for polarity states of driver suspension signal 197 and FIR activation signal 191.

In the top two rows of truth table 200, driver suspension signal 197 is asserted or active for putting VMTX 100 in a suspended mode, such as a tri-state mode 201. Along those lines, an ODT state signal ("is_tristate_odt) 215 is asserted responsive to assertion of driver suspension signal 197 regardless of states of FIR activation signal 191 and data inputs 17 and 18. Effectively, driver suspension signal 197 is to tri-state a driver circuit 114 for a receiver mode in an implementation where VMTX 100 is in a bi-directional device, such as a receiver mode in an IOB. However, VMTX 100 need not be used in a bi-directional device, and thus driver suspension signal 197 may be omitted along with other signals associated with a receiver mode.

In the bottom two rows of truth table 200, driver suspension signal 197 is not asserted or is deasserted for putting VMTX 100 into one of two transmission modes, such as either a TX with FIR mode 202 or a TX without FIR mode 203. If FIR activation signal 191 is asserted and driver suspension signal 197 is not asserted, then any one of four state signals 211 through 214 may be asserted responsive to polarities of data pairs of data inputs 17 and 18 for VMTX 100 in a TX with FIR equalization mode. Along those lines, for data of data inputs 17 and 18 both having a polarity of 0, namely "00", then a "strong" low state signal ("is_StrongLo") 211 is asserted for selection of driver strength with FIR equalization. For data of data input 17 and data input 18 respectively having a 0 and 1 polarity, namely "01", then a "weak" low state signal ("is_WeakLo") 212 is asserted for selection of driver strength with FIR equalization. For data of data input 17 and 18 both having a polarity of 1, namely "11", then a "strong" high state signal ("is_StrongHi") 213 is asserted for selection of driver strength with FIR equalization. For data of data input 17 and data input 18 respectively having a 1 and 0 polarity, namely "10", then a "weak" high state signal ("is_WeakHi") 214 is asserted for selection of driver strength with FIR equalization. State signals 211 through 214 are for different driver strengths for pull-up or pull-down voltages, as previously described, for legs of a driver circuit in an FIR equalization mode.

If FIR activation signal 191 is not asserted and driver suspension signal 197 is not asserted, then either of state signals 211 or 213 may be asserted responsive to polarity of data input 17 for VMTX 100 in a TX without FIR equalization mode. For data input 17 having a 0 polarity, then a "strong" low state signal ("is_StrongLo") 211 is asserted for selection of driver strength without FIR equalization. For data input 17 having a 1 polarity, then a "strong" high state signal ("is_StrongHi") 213 is asserted for selection of driver strength without FIR equalization.

In this example implementation for having both optional FIR equalization and optional RX ODT, state signals 199 may be generated by a decoder 190 responsive to received data input 17, data input 18, and control signals tri_state_b 197 and en_TX_fir 191, namely a subset of control signals which may be provided to TX-DCI control circuit 110.

Figure 7A:
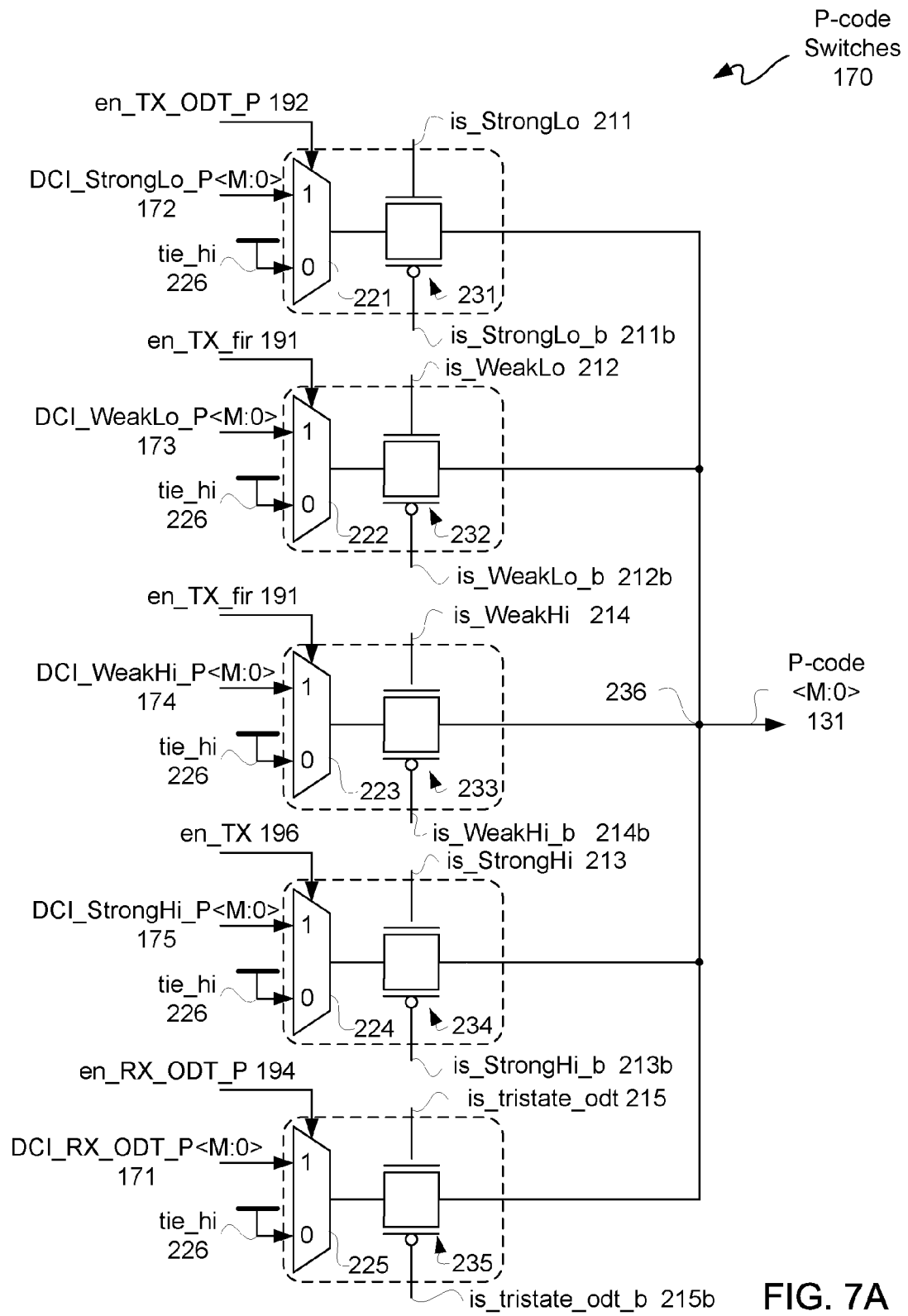
FIG. 7A is a circuit diagram illustratively depicting an exemplary set of P-code switches for the TX-DCI control circuit of FIG. 5.
Figure 7B:
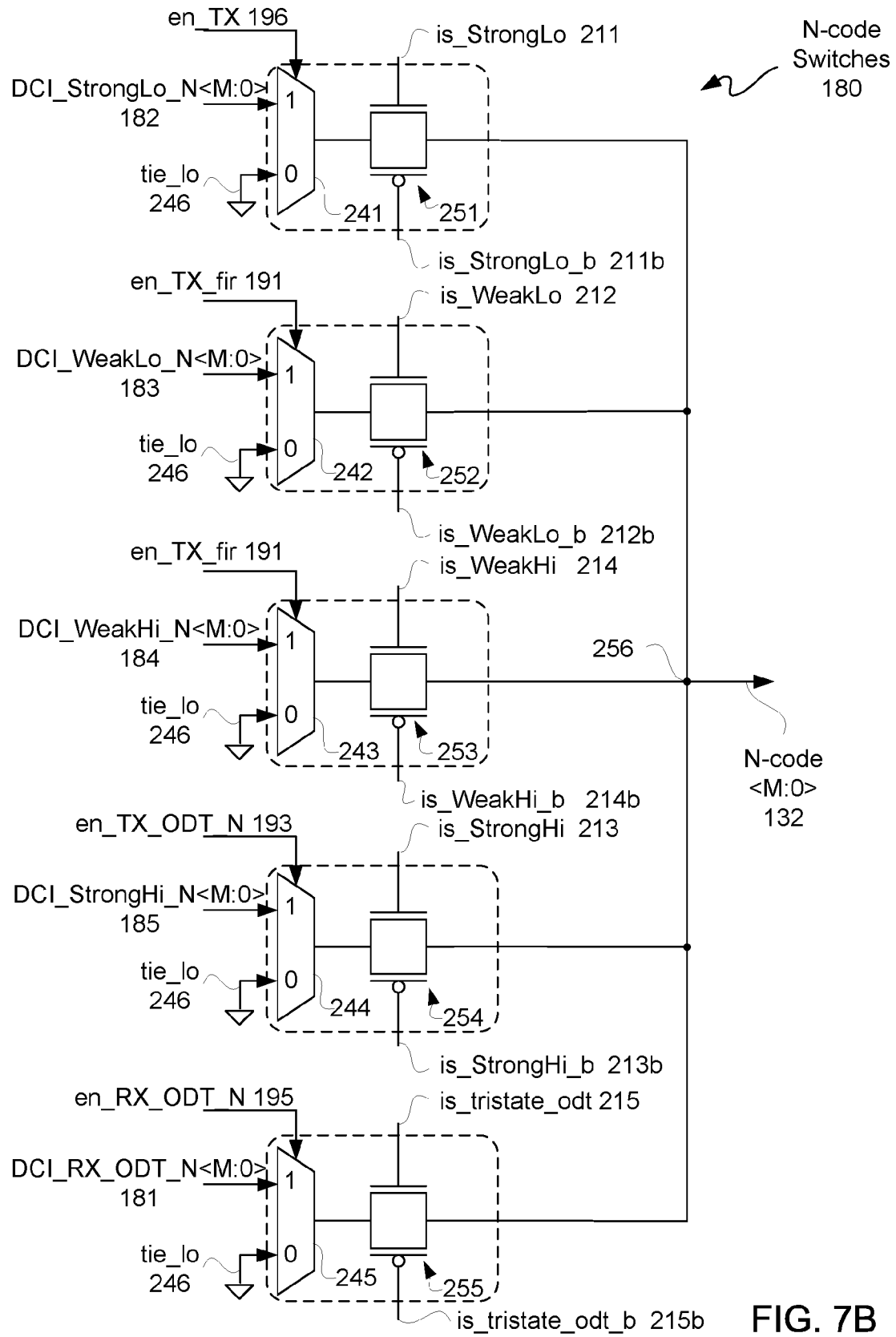
FIG. 7B is a circuit diagram illustratively depicting an exemplary set of N-code switches for the TX-DCI control circuit of FIG. 5.

FIG. 7A is a circuit diagram illustratively depicting an exemplary set of P-code switches 170, and FIG. 7B is a circuit diagram illustratively depicting an exemplary set of N-code switches 180. P-code switches 170 and N-code switches 180 are both for a VMTX 100 in a transceiver or IOB context in this example. In both examples, "tie_hi" 226 and "tie_lo" 246 are respectively for "logic high" and "logic low" states, such as by respectively coupling to a VCCINT_IO 25 supply bus and a ground.

A data input of each of first stage multiplexers 221 through 225 is coupled to a tie_hi 226 for selection for output of a logic high responsive to assertion of a logic low select signal. Another data input of each of first stage multiplexers 221 through 224 is respectively configured to receive a P-coded signal 172 through 175, and another data input to multiplexer 225 is configured to receive a P-coded signal 171 such as for a reception mode as previously described. Each of P-coded signals 171 through 175 in this example is selected for output from a corresponding multiplexer responsive to assertion of a logic high control select signal. Control select signals for multiplexers 221 through 225 form a subset of the previously described control signals provided to decoder 190 and respectively are positive polarity transmitter-side ODT activation signal ("en_TX_ODT_P") 192, FIR activation signal ("en_TX_fir") 191, FIR activation signal ("en_TX_fir") 191, voltage mode transmission activation signal ("en_TX") 196, and positive polarity receiver-side ODT activation signal ("en_RX_ODT_P") 194.

A data input of each of first stage multiplexers 241 through 245 is coupled to a tie_lo 246 for selection for output of a logic low responsive to assertion of a logic low select signal. Another data input of each of first stage multiplexers 241 through 244 is respectively configured to receive an N-coded signal 182 through 185, and another data input to multiplexer 245 is configured to receive an N-coded signal 181 such as for a reception mode as previously described. Each of N-coded signals 181 through 185 in this example is selected for output from a corresponding multiplexer responsive to assertion of a logic high control select signal. Control select signals for multiplexers 241 through 245 form a subset of the previously described control signals provided to decoder 190 and respectively are voltage mode transmission activation signal ("en_TX") 196, FIR activation signal ("en_TX_fir") 191, FIR activation signal ("en_TX_fir") 191, negative polarity transmitter-side ODT activation signal ("en_TX_ODT_N") 193, and negative polarity receiver-side ODT activation signal ("en_RX_ODT_N") 195.

Outputs from multiplexers 221 through 225 are respectively provided to pass-gated transistor NMOS-PMOS pairs 231 through 235, namely transmission gates for full rail-to-rail output signaling, coupled in source-drain parallel with active high and corresponding active low state signals respectively gating such NMOS and PMOS transistors. NMOS-PMOS transistor pairs 231 through 235 may be thought of as second stage multiplexers with input nodes respectively coupled to outputs of multiplexers 221 through 225. In another implementation, NMOS-only or PMOS-only transistors may be used. For example, NMOS transistors 231 through 235 without any corresponding PMOS transistors may be used provided, however, state signals 211 through 215 have a voltage of at least VCCINT_IO plus a threshold voltage of such NMOS transistors.

NMOS-PMOS transistor pair 231 is respectively gated with a "strong" low or "StrongLo" state signal ("is_StrongLo") 211 and a complement signal thereof 211b. NMOS-PMOS transistor pair 232 is respectively gated with a "weak" low or "WeakLo" state signal ("is_WeakLo") 212 and a complement signal thereof 212b. NMOS-PMOS transistor pair 233 is respectively gated with a "weak" high or "WeakHi" state signal ("is_WeakHi") 214 and a complement signal thereof 214b. NMOS-PMOS transistor pair 234 is respectively gated with a "strong" high or "StrongHi" state signal ("is_StrongHi") 213 and a complement signal thereof 213b. NMOS-PMOS transistor pair 235 is respectively gated with an ODT state signal ("is_tristate_odt) 215 and a complement signal thereof 215b. Outputs of NMOS-PMOS transistor pairs 231 through 235 are commonly coupled to output node 236 from which P-code <M:0> signal 131 may be sourced.

Outputs from multiplexers 241 through 245 are respectively provided to pass-gated transistor NMOS-PMOS pairs 251 through 255 coupled in source-drain parallel with active high and corresponding active low state signals respectively gating such NMOS and PMOS transistors. NMOS-PMOS transistor pairs 251 through 255 may be thought of as second stage multiplexers with input nodes respectively coupled to outputs of multiplexers 241 through 245.

NMOS-PMOS transistor pair 251 is respectively gated with a "strong" low state signal ("is_StrongLo") 211 and a complement signal thereof 211b. NMOS-PMOS transistor pair 252 is respectively gated with a "weak" low state signal ("is_WeakLo") 212 and a complement signal thereof 212b. NMOS-PMOS transistor pair 253 is respectively gated with a "weak" high state signal ("is_WeakHi") 214 and a complement signal thereof 214b. NMOS-PMOS transistor pair 254 is respectively gated with a "strong" high state signal ("is_StrongHi") 213 and a complement signal thereof 213b. NMOS-PMOS transistor pair 255 is respectively gated with an ODT state signal ("is_tristate_odt) 215 and a complement signal thereof 215b. Outputs of NMOS-PMOS transistor pairs 251 through 255 are commonly coupled to output node 256 from which N-code <M:0> signal 132 may be sourced.

Code select circuits, such as first multiplexers 221 through 225 and second multiplexers 231 through 235, may be configured to receive coded signals 171 through 175 and state signals 199 and may be configured to selectively output internal pull-up code 131. Moreover, code select circuits may be configured to receive the second coded signals and the state signals and configured to selectively output the internal pull-down code.

P-code switches 170 and N-code switches 180 may each include two stages of multiplexers. Respective subsets of control signals may be used as control selects for first stage multiplexers. For control selects set to logic 0, logic high and logic low, respectively of P-code switches 170 and N-code switches 180, are output from such first stage multiplexers. By programming or otherwise configuring states of such respective subsets of control signals, VMTX 100 may be configured to operate in a single-ended TX without FIR equalization mode, a single-ended TX with FIR equalization mode, a component of a differential TX without FIR equalization mode, a component of a differential TX with FIR equalization mode, or an RX ODT mode.

Second stage multiplexers may be configured to respectively pass or not pass outputs from first stage multiplexers responsive to state signals 199 output from decoder 190. Decoder 190 state signals 199 may be used to configure driver circuit drive strength dynamically responsive to polarity of input data (in_data, or in_data in_data_fir), as well as states of optional control signals for an optional reception mode and/or an optional FIR equalization mode, namely states of tri_state_b signal 197 and en_TX_fir signal 191.

Returning to FIG. 3, P-code signal 131 and N-code signal 132 may be respectively output from TX-DCI control circuit 110 from a VCCINT_IO power domain. A level shifter circuit 111 may be configured to receive an internal pull-up code and an internal pull-down code, such as respectively P-code signal 131 and N-code signal 132.

Level shifter circuit 111 may be include conventional level shifters configured to shift voltage of P-code signal 131 and N-code signal 132 from an internal input-output level, such as VCCINT_IO level 25, up to an output voltage level, such as VCCO level 28, to provide a voltage-shifted pull-up code and a voltage-shifted pull-down code, such as respectively P-code_lvl<M:0> signal 133 and N-code_lvl<M:0> signal 134. Thus, level shifter circuit 111 may include both power domains, namely a VCCINT_IO VCCO domain 126.

A pre-driver circuit 113 may be configured to receive P-code_lvl<M:0> signal 133 and N-code_lvl<M:0> signal 134. Pre-driver circuit 113 may be configured to buffer P-code_lvl<M:0> signal 133 and N-code_lvl<M:0> signal 134 for an output voltage level, such as a VCCO level 28, to provide a buffered pull-up code and a buffered pull-down code, P-code_pre<M:0> signal 135 and N-code_pre<M:0> signal 136, respectively.

A driver circuit 114 may be configured to receive P-code_pre<M:0> signal 135 and N-code_pre<M:0> signal 136. Driver circuit 114 may be configured to generate drive strength dynamically responsive to the P-code_pre<M:0> signal 135 and N-code_pre<M:0> signal 136 to drive a data output 115. Driver circuit 114 and pre-driver circuit 113 may both operate in a VCCO power domain. Data output 115 may be single-ended data with or without FIR equalization, or data output 115 may be half of a differential output with or without FIR equalization. Optionally data output 115 may be suspended in favor of using one or more legs of driver circuit 114 as RX ODT.

Figure 8:
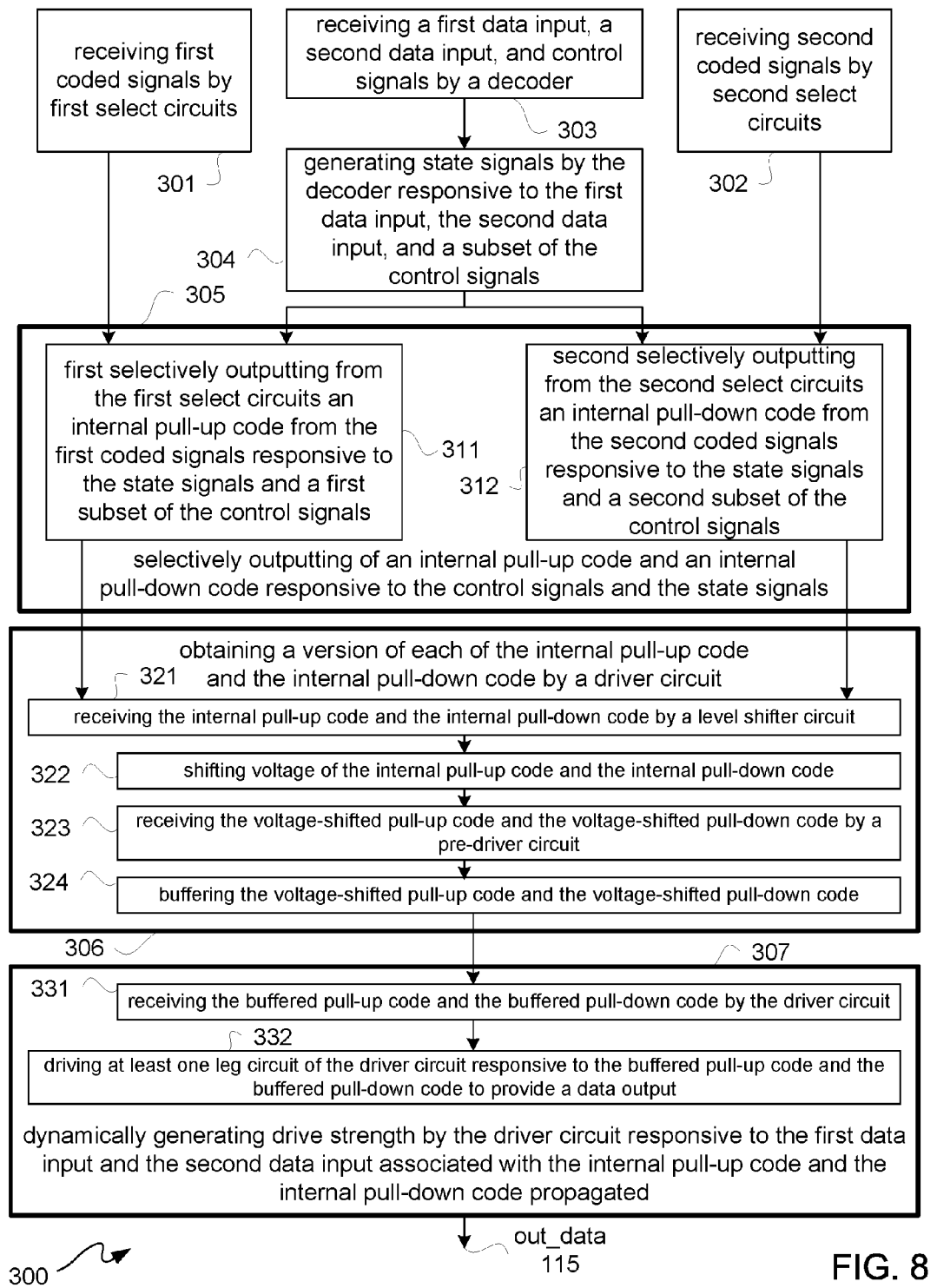
FIG. 8 is a flow diagram illustratively depicting an exemplary output data generation flow for transmission.

With the above description borne in mind, FIG. 8 is a flow diagram illustratively depicting an exemplary output data generation flow 300 for transmission. The terms "first", "second", etc. as used hereinbelow are not meant to indicate any order, but merely are for distinguishing between different operations, components, or other same or similar items.

For output data generation flow 300 at 303, a first data input 17, a second data input 18, and control signals, such as one or more control signals 191 through 197, may be received by a decoder 190. Contemporaneously, at 301 first coded signals, such as one or more of coded signals 171 through 175, may be received by first code select circuits, such as P-code switches 170, and at 302 second coded signals, such as one or more of coded signals 181 through 185, may be received by second code select circuits, such as N-code switches 180.

From 303, at 304 state signals, such as state signals 211 through 214, may be generated by decoder 190 responsive to first data input 17, second data input 18, and a subset of control signals 191 through 197, namely en_TX_fir 191. Such subset of control signals may optionally include tri_state_b 197 if RX ODT is an option.

From 301, 302, and 304, at 305 an internal pull-up code and an internal pull-down code may be selectively output responsive to state signals 211 through 214. Operations at 305 may include operations at 311 and 312. At 311, first selectively output from first code select circuits 170 may be an internal pull-up code, such as P-code 131, from first coded signals 171 through 175 responsive to state signals 211 through 214. At 312, second selectively output from second code select circuits 180 may be an internal pull-down code, such as N-code 132, from second coded signals 181 through 185 responsive to state signals 211 through 214.

From 305, at 306 internal pull-up code 131 and internal pull-down code 132 may be propagated downstream to a driver circuit, such as driver-DCI circuit 114. Operations at 306 may include operations at 321 through 324. At 321, internal pull-up code 131 and internal pull-down code 132 may be received by a level shifter circuit 111. At 322, voltage of internal pull-up code 131 and internal pull-down code 132 may be shifted from an internal input-output level, such as VCCINT_IO level 25, up to an output voltage level, such as a VCCO level 28, by level shifter circuit 111 to provide a voltage-shifted pull-up code, such as P-code 133, and a voltage-shifted pull-down code, such as N-code 134.

At 323, voltage-shifted pull-up code 133 and voltage-shifted pull-down code 134 may be received by a pre-driver circuit 113. At 324, voltage-shifted pull-up code 133 and voltage-shifted pull-down code 134 may be buffered for or to output voltage level 28 with pre-driver circuit 113 to provide a buffered pull-up code 135 and a buffered pull-down code 136.

From 306, at 307 drive strength may be dynamically generated by driver circuit 114 responsive to first data input 17 and second data input 18, namely effectively polarities of such data inputs propagated downstream in DCI coded signals as a version of internal pull-up code 131 and a version of internal pull-down code 132. From such dynamically generated drive strength, data output 115 may be output, where drive strength of such data output varies responsive to polarity of data inputs 17 and 18 for FIR equalization.

Operations at 307 may include operations 331 and 332. At 331, buffered pull-up code 135 and buffered pull-down code 136 may be received by driver circuit 114. At 332, at least one leg circuit of driver circuit 114 may be driven responsive to buffered pull-up code 135 and buffered pull-down code 136 to provide a data output 115. Again, data output 115 may be generated with dynamically generated drive strength by driver circuit 114 responsive to data polarity of first data input 17 and second data input 18 to provide P-code 131 and N-code 132. Thus, responsive to such DCI codes, driver circuit 114 provides FIR equalization with the driving of at least one leg circuit of such driver circuit.

Figure 9C:
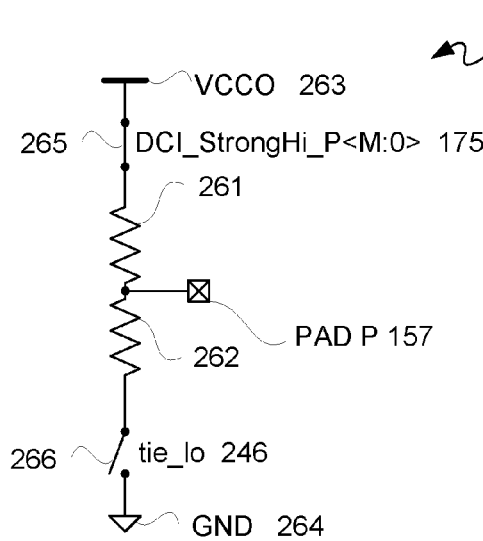

FIGS. 9A through 9F are respective schematic diagrams illustratively depicting an exemplary leg circuit 281 of driver circuit 114 in configurations 271 through 276, respectively. With reference to FIG. 9A, in this example there are leg circuits 281-0 through 281-M of leg circuit or network 281 in configuration 271. In FIGS. 9B through 9F leg circuit 281 is generally represented as a single leg circuit for purposes of clarity and not limitation; however, it should be understood that even though each of configurations 272 through 276 is represented as a single leg, such single leg represents multiple legs such as illustratively depicted in FIG. 9A.

Each of leg circuits 281-0 through 281-M is biased between a VCCO supply voltage bus 263 and a ground bus 264, and each of leg circuits 281-0 through 281-M is coupled to a common output pad, which in this example is a pad P 157. However, another leg circuit 281 of another driver circuit 114 of another VMTX 100 may be used for coupling to a common output pad N 158.

In each of leg circuits 281-0 through 281-M, a source node of a PMOS transistor 265 is coupled to a supply bus 263, and a source node of an NMOS transistor 266 is coupled to a ground bus 264. Coupled between a drain node of PMOS transistor 265 and output pad P 157 is a pull-up side termination resistor 261, and coupled between a drain node of NMOS transistor 266 and output pad P 157 is a pull-down side termination resistor 262.

Gates of PMOS transistors 265 of leg circuits 281-0 through 281-M are respectively coupled to be gated with bits <0:M> of a pull-up DCI code, namely a selected P-code 131 which in this non-limiting example is DCI_StrongHi coded signal 175. Gates of NMOS transistors 266 of leg circuits 281-0 through 281-M are respectively coupled to be gated with bits <0:M> of a pull-down DCI code, namely a selected N-code 132 which in this non-limiting example is tie_lo signal 246.

FIGS. 9A and 9B are to configure VMTX 100 as a single-ended TX without FIR equalization, where en_TX 196 is set to "logic high", and en_TX_fir 191, en_TX_ODT_P/N 192/193 and en_RX_ODT_P/N 194/195 may all be set to "logic low". FIG. 9A is for a StrongHi configuration 271 for when data input 17 is propagated to such leg circuit as a logic high or logic 1. FIG. 9B is the same as FIG. 9A, however, FIG. 9B is for a StrongLo configuration 272 version of FIG. 9A for when data input 17 is propagated to such leg circuit as a logic low or logic 0. For an implementation configured as a 40 ohm single-ended TX, DCI_StrongHi_P<M:0> and DCI_StrongLo_N<M:0> codes 175 and 182 configure pull-up and pull-down legs respectively to 40 ohm drive strength.

To drive a "logic high" as in FIG. 9A, P-code<M:0>131 may be selected as DCI_StrongHI_P<M:0>175 and N-code<M:0>132 may be selected as tie_lo 246, and to drive a "logic low" as in FIG. 9B, P-code<M:0>131 may be selected as tie_hi 226 and N-code<M:0>132 may be selected as DCI_strongLo_N<M:0>182. Flexibly supporting multiple drive strengths for transmission may be provided by using different codes. For example, to configure a 50 ohm single-ended TX, DCI_strongHi_P<M:0> and DCI_strongLo_N<M:0> codes 175 and 182 may be set 50 ohm codes.

FIGS. 9C through 9F are to configure VMTX 100 as a single-ended TX with FIR equalization. In this example, en_TX 196 and en_TX_fir 191 may be set to "logic high", and en_TX_ODT_P/N 192/193 and en_RX_ODT_P/N 194/195 may be set to "logic low". For example, to configure VMTX 100 as a single-ended TX with 2.96 dB FIR equalization, DCI_StrongHi_P<M:0>175 and DCI_StrongLo_N<M:0>182 may each be set to 34 ohm drive strength. DCI_WeakHi_P<M:0>174 and DCI_WeakLo_N<M:0>173 may each be set to 40 ohm drive strength. DCI_WeakLo_P<M:0> and DCI_WeakHi_N<M:0> may be each set to 240 ohm drive strength. In this example, drive strength of a single driver circuit 114 may change between 34 ohm, 40 ohm, 240 ohm and infinity (i.e., open circuit) responsive to polarity of data input 17 and data input 18.

Figure 9D:
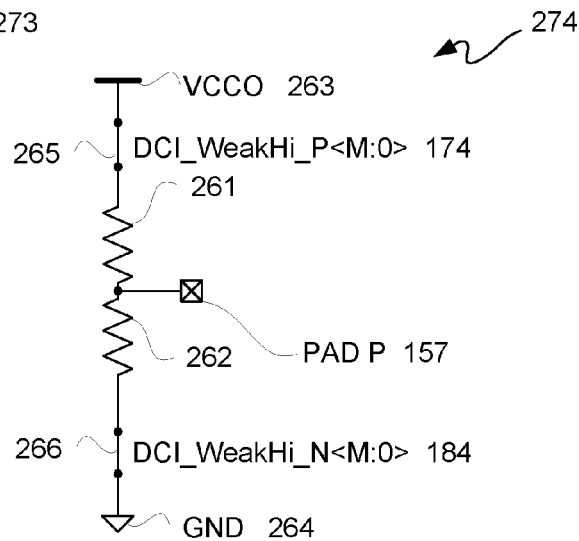

In FIG. 9C, a StrongHi configuration 273 is illustratively depicted for data inputs 17 and 18 both having a polarity of logic 1, where DCI_StrongHi_P<M:0> 175 and tie_lo 246 respectively gate transistors 265 and 266, illustratively depicted as switches for clarity. In FIG. 9D, a WeakHi configuration 274 is illustratively depicted for data inputs 17 and 18 respectively having polarities of logic 1 and 0, where DCI_WeakHi_P<M:0> 174 and DCI_WeakHi_N<M:0> 184 respectively gate transistors 265 and 266, illustratively depicted as switches for clarity.

Figure 9E:
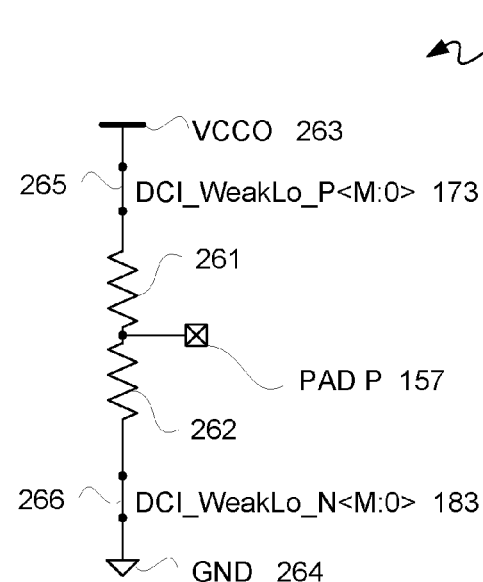
Figure 9F:
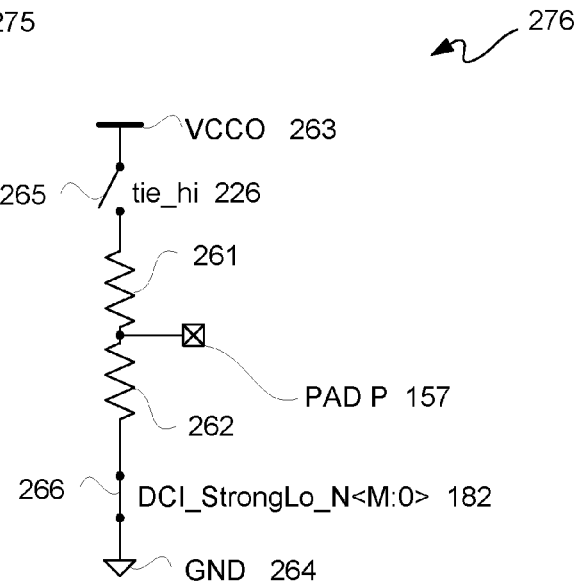

In FIG. 9E, a WeakLo configuration 275 is illustratively depicted for data inputs 17 and 18 respectively having polarities of logic 0 and 1, where DCI_WeakLo_P<M:0>173 and DCI_WeakLo_N<M:0>183 respectively gate transistors 265 and 266, illustratively depicted as switches for clarity. In FIG. 9F, a StrongLo configuration 276 is illustratively depicted for data inputs 17 and 18 both having a polarity of logic 0, where tie_hi 226 and DCI_StrongLo_N<M:0>182 respectively gate transistors 265 and 266, illustratively depicted as switches for clarity.

In the past for example, main-cursor and post-cursor drive strengths of separate drivers were at fixed levels, where for example a main-cursor and a post-cursor driver may be preset respectively with different drive strengths. Thus, in the past, it was determined which main and/or post-cursor drivers of which segments would be active to provide output data. In contrast, a single driver may be used with a dynamically changing drive strength responsive to propagation of DCI codes, which in this example are binary coded DCI codes.

Figure 10:
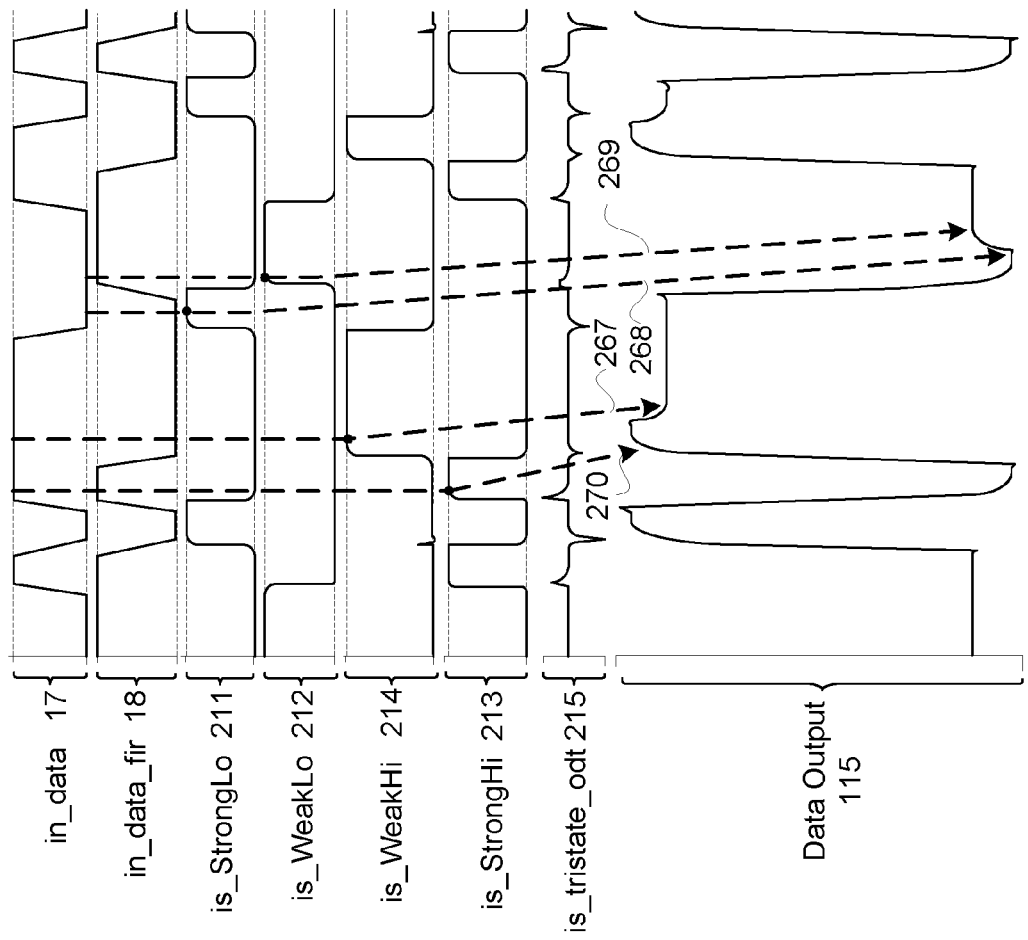
FIG. 10 is a signal diagram illustratively depicting exemplary simulated waveforms for signals of the VMTX of FIG. 3 configured as a single-ended transmitter ("TX") with finite impulse response ("FIR") equalization.

FIG. 10 is a signal diagram illustratively depicting exemplary simulated waveforms for signals of VMTX 100 configured as a single-ended TX with FIR equalization. Arrow 270 is to indicate that for data input 17 and 18 both of polarity 1, is_StrongHi 213 is asserted to provide a generally highest signal level in data output 115. Arrow 267 is to indicate that for data input 17 and 18 respectively of polarities 1 and 0, is_WeakHi 214 is asserted to provide an intermediary high signal level in data output 115. Arrow 268 is to indicate that for data input 17 and 18 both of polarity 0, is_StrongLo 211 is asserted to provide a generally lowest signal level in data output 115. Arrow 269 is to indicate that for data input 17 and 18 respectively of polarities 0 and 1, is_WeakLo 212 is asserted to provide an intermediary low signal level in data output 115. In these examples, is_tristate_odt 215 is not asserted.

Figure 11A:
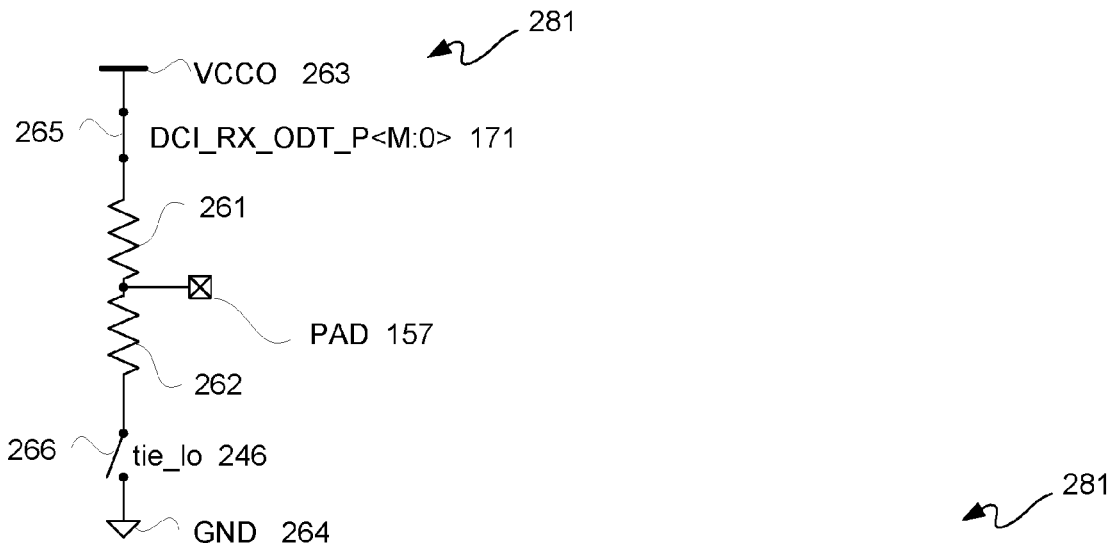
FIGS. 11A through 11C are respective schematic diagrams illustratively depicting an exemplary leg circuit of the driver circuit of the VMTX of FIG. 3 in respective on-die termination ("ODT") configurations.
Figure 11B:
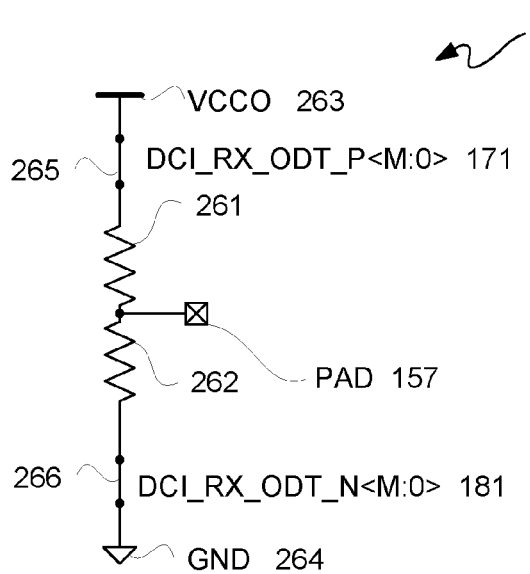
Figure 11C:
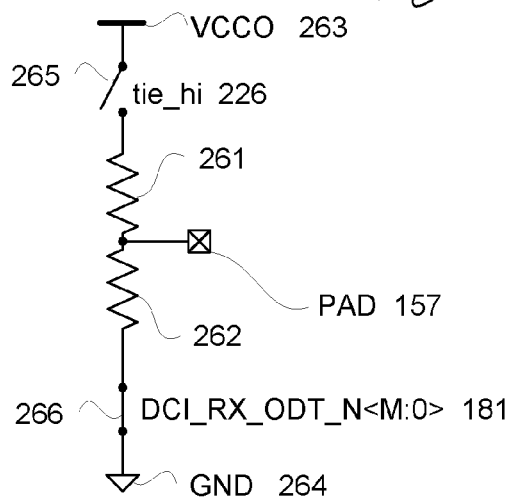

FIGS. 11A through 11C are respective schematic diagrams illustratively depicting an exemplary leg circuit 281 of driver circuit 114 in respective ODT configurations. Again, for purposes of clarity and not limitation, transistors are illustratively depicted as switches and not all legs are particularly depicted. More particularly, for these examples, it follows that FIGS. 11A through 11C respectively are for ODT terminated with respect to a VCCO supply level, a ½*VCCO supply level, and a ground level.

To configure VMTX 100 in an RX ODT mode, en_TX 196, en_TX_fir 191, and en_TX_ODT_P/N 192/193 are all set to "logic low". For ODT terminated with respect to a VCCO supply level, en_RX_ODT_P 194 is set to "logic high" and en_RX_ODT_N 195 is set to "logic low". For ODT terminated with respect to a ground level, en_RX_ODT_P 194 is set to "logic low" and en_RX_ODT_N 195 is set to "logic high". For ODT terminated with respect to a ½*VCCO supply level (i.e., a centered-tap termination), en_RX_ODT_P 194 is set to "logic high" and en_RX_ODT_N 195 is set to "logic high".

ODT impedance can be programmed or otherwise configured through DCI_RX_ODT_P<M:0> code 171 and DCI_ RX_ODT_ N<M:0> code 181 respectively selected as P-code 131 and N-code 132. For ODT terminated with respect to a VCCO supply level, DCI_RX_ODT_P<M:0> code 171 and tie_lo 246 are selectively output for application to gates of transistors 265 and 266, respectively. For ODT terminated with respect to a ½*VCCO supply level, DCI_RX_ODT_P<M:0> code 171 and DCI_RX_ODT_N<M:0> code 181 are selectively output for application to gates of transistors 265 and 266, respectively. For ODT terminated with respect to a ground level, tie_hi 226 and DCI_RX_ODT_N<M:0> code 181 are selectively output for application to gates of transistors 265 and 266, respectively.

Figure 12A:
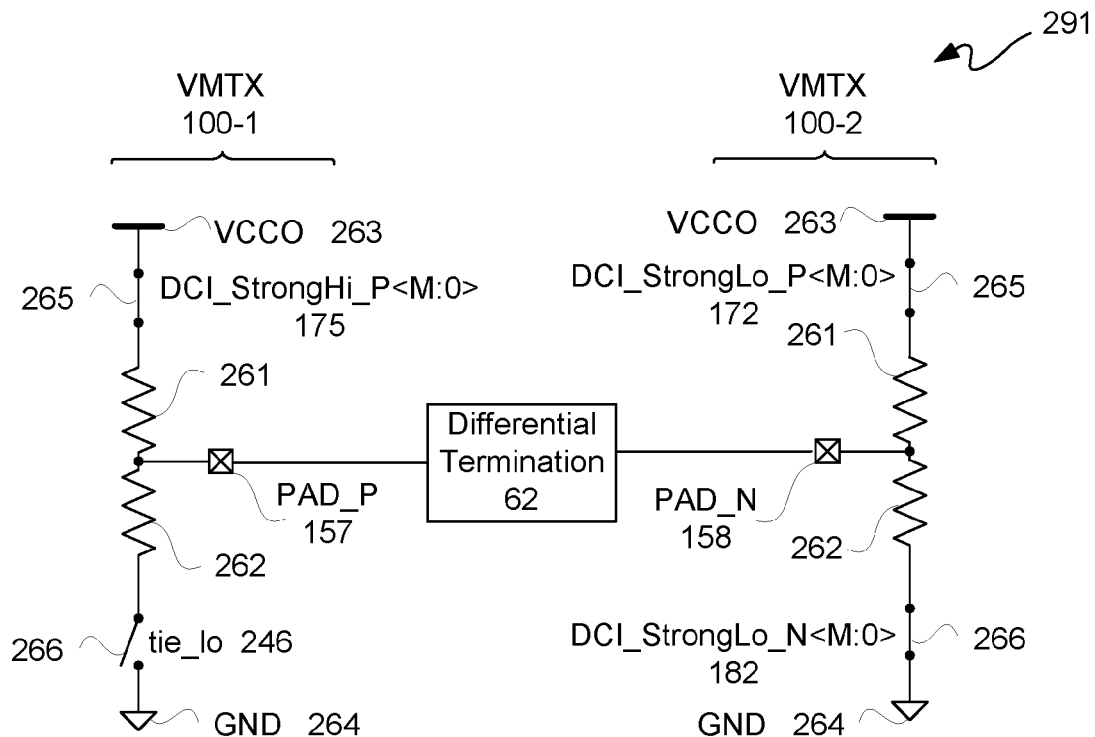
FIGS. 12A through 12D are respective schematic diagrams illustratively depicting exemplary leg circuits of driver circuits respectively of VMTXs of FIG. 3 in configurations for a differential TX without FIR equalization.
Figure 12B:
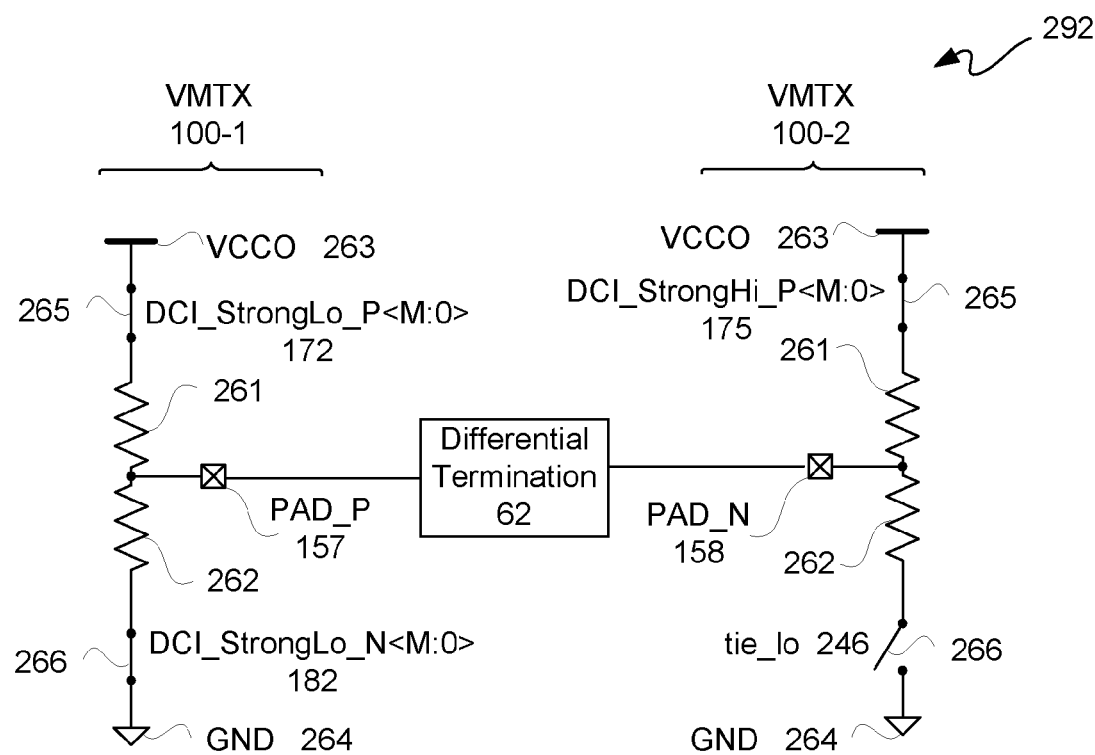
Figure 12C:
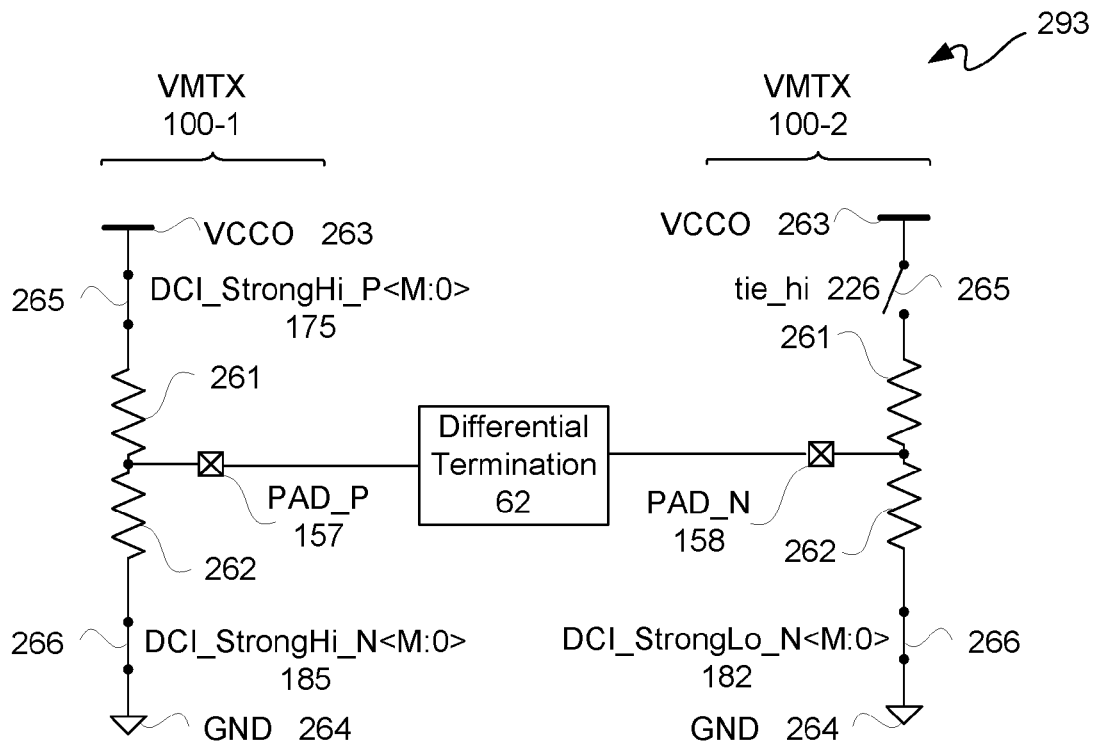
Figure 12D:
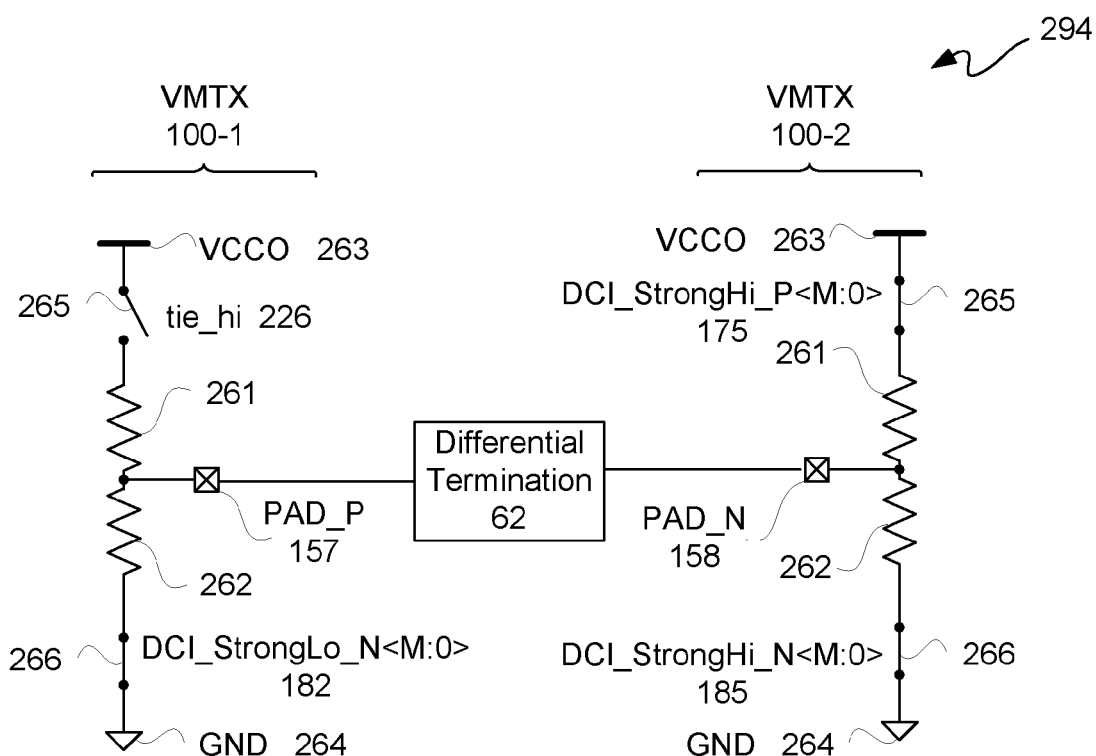
Figure 13A:
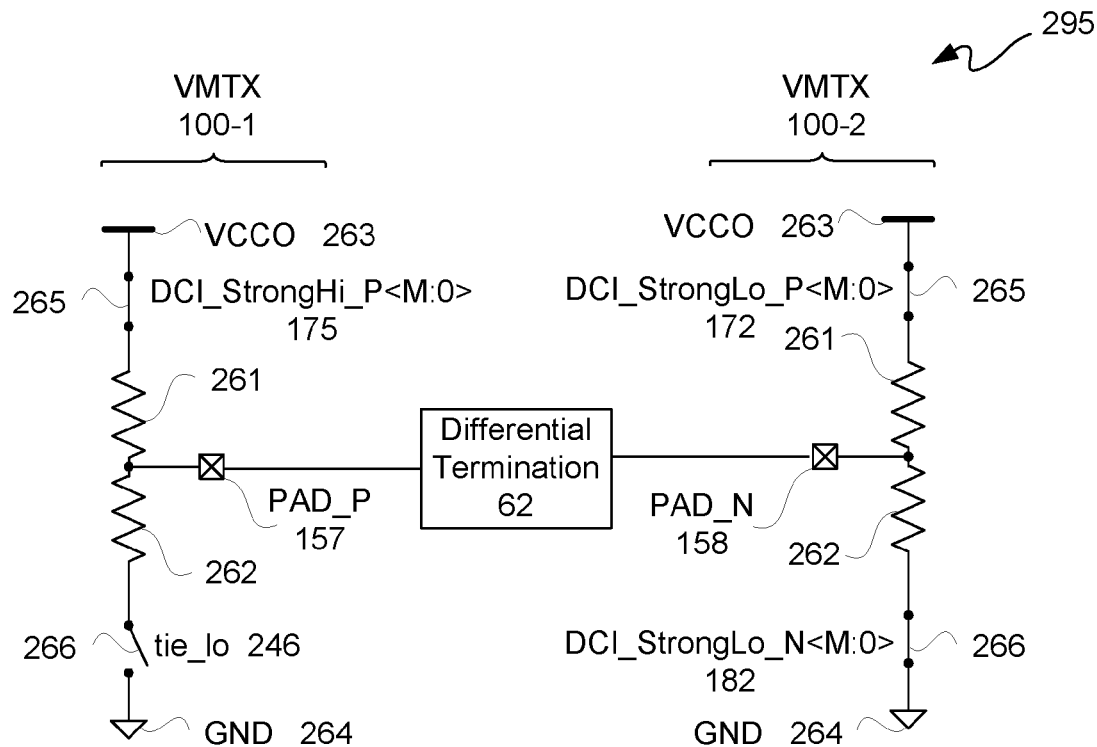
FIGS. 13A through 13D are respective schematic diagrams illustratively depicting exemplary leg circuits of driver circuits respectively of VMTXs of FIG. 3 for configurations of a differential TX with FIR equalization.
Figure 13B:
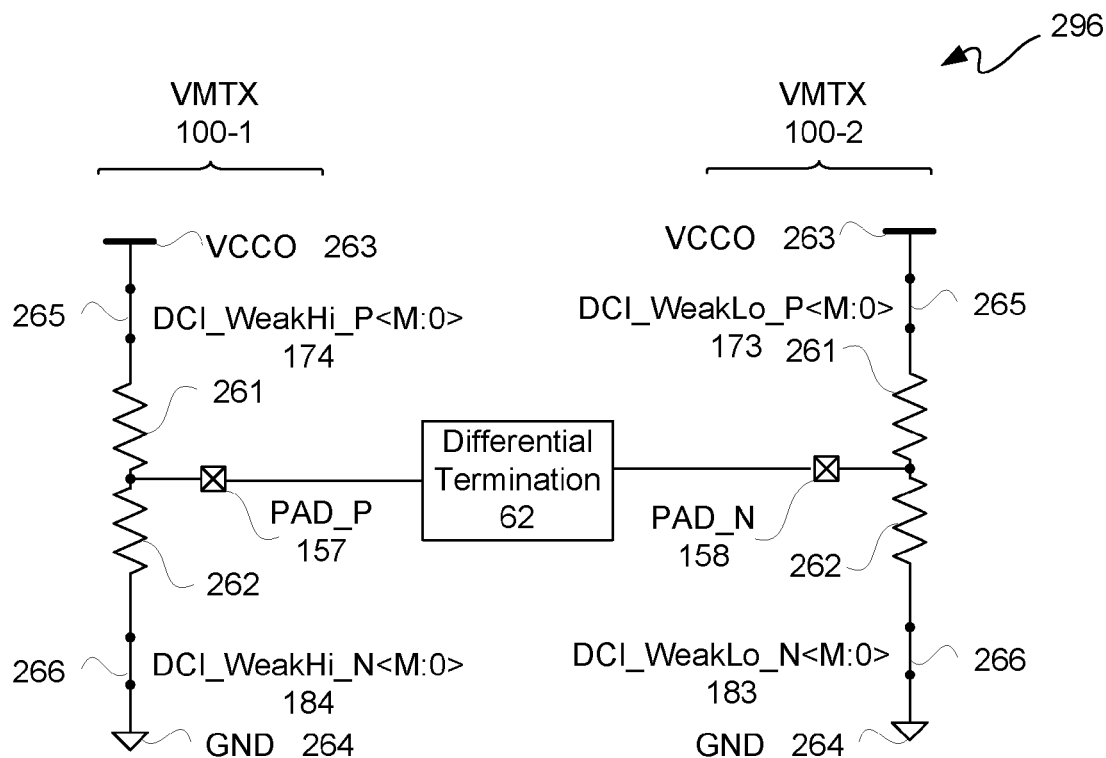
Figure 13C:
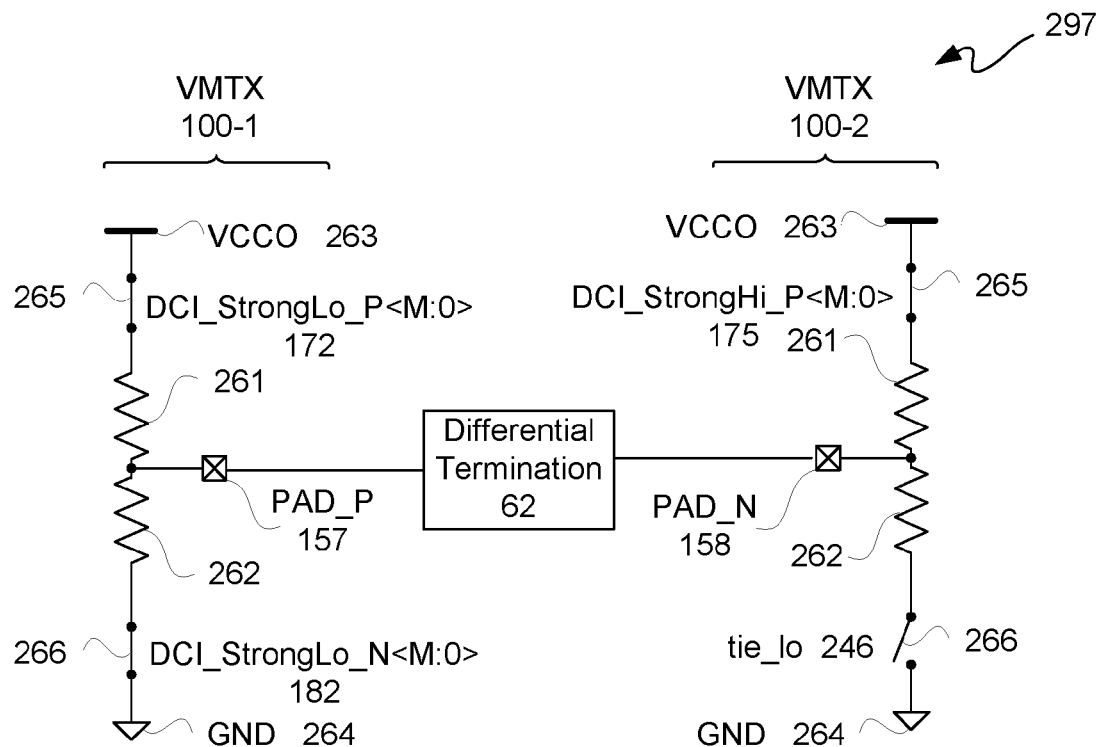
Figure 13D:
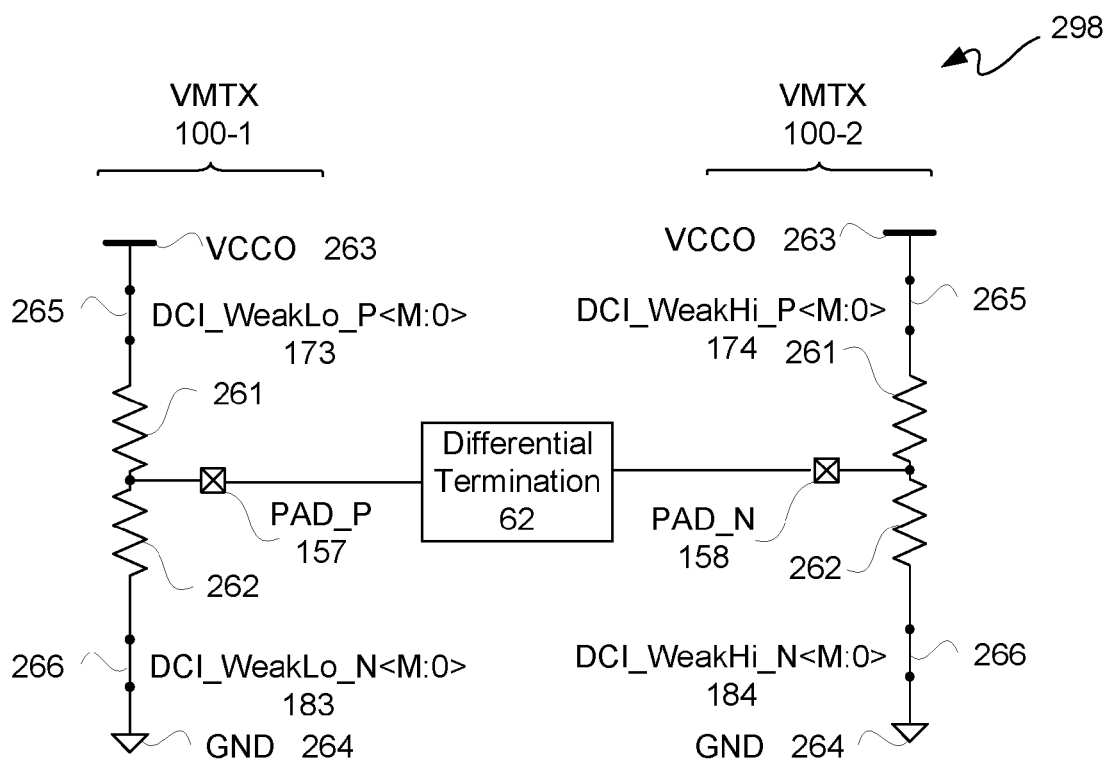

VMTXs 100 of FIG. 4 may be used together. Along those lines, such VMTXs 100 may be configured as a differential TX. FIGS. 12A through 12D are respective schematic diagrams illustratively depicting exemplary leg circuits 281 of driver circuits 114 respectively of VMTXs 100-1 and 100-2 in configurations for a differential TX without FIR equalization. FIGS. 12A and 12B are a differential TX with en_TX_ODT_P 192 asserted; and FIGS. 12C and 12D are a differential TX with en_TX_ODT_N 193 asserted. In each of these configurations, en_TX 196 is set to "logic high", and en_TX_fir 191 and en_RX_ODT_P/N 194/195 are set to "logic low". In these configurations, en_TX_ODT_P 192 and en_TX_ODT_N 193 may be set for a target output common mode voltage ("VOCM"), as may vary from application-to-application.

FIGS. 12A and 12B are for a differential TX configuration with high VOCM which sets en_TX_ODT_P 192 to "logic high" and en_TX_ODT_N 193 to "logic low". For a StrongHi configuration 291, data input 17 is of polarity 1, and a positive-side VMTX 100-1 selectively outputs DCI_StrongHi_P<M:0> code 175 and tie_lo code 246 for application to gates of positive-side transistors 265 and 266, respectively, and a negative-side VMTX 100-2 selectively outputs DCI_StrongLo_P<M:0> code 172 and DCI_StrongLo_N<M:0> code 182 for application to gates of negative-side transistors 265 and 266, respectively. For a StrongLo configuration 292, data input 17 is of polarity 0, and a positive-side VMTX 100-1 selectively outputs DCI_StrongLo_P<M:0> code 172 and DCI_StrongLo_N<M:0> code 182 for application to gates of positive-side transistors 265 and 266, respectively, and a negative-side VMTX 100-2 selectively outputs DCI_StrongHi_P<M:0> code 175 and tie_lo code 246 for application to gates of negative-side transistors 265 and 266, respectively.

FIGS. 12C and 12D are for a differential TX configuration with low VOCM which sets en_TX_ODT_P 192 to "logic low" and en_TX_ODT_N 193 to "logic high". For a StrongHi configuration 293, data input 17 is of polarity 1, and a positive-side VMTX 100-1 selectively outputs DCI_StrongHi_P<M:0> code 175 and DCI_StrongHi_N<M:0> code 185 for application to gates of positive-side transistors 265 and 266, respectively, and a negative-side VMTX 100-2 selectively outputs tie_hi code 226 and DCI_StrongLo_N<M:0> code 182 for application to gates of negative-side transistors 265 and 266, respectively. For a StrongLo configuration 294, data input 17 is of polarity 0, and a positive-side VMTX 100-1 selectively outputs tie_hi code 226 and DCI_StrongLo_N<M:0> code 182 for application to gates of positive-side transistors 265 and 266, respectively, and a negative side VMTX 100-2 selectively outputs DCI_StrongHi_P<M:0> code 175 and DCI_StrongHi_N<M:0> code 185 for application to gates of negative-side transistors 265 and 266, respectively.

FIGS. 13A through 13D are respective schematic diagrams illustratively depicting exemplary leg circuits 281 of driver circuits 114 respectively of VMTXs 100-1 and 100-2 for configurations of a differential TX with FIR equalization. FIGS. 13A through 13D are a differential TX with FIR equalization with en_TX_ODT_P 192 asserted (e.g., "logic high") and en_TX_ODT_N 193 deasserted (e.g., "logic low"). In each of these configurations, en_TX 196 and en_TX_fir 191 are both set to "logic high", and en_RX_ODT_P/N 194/195 are both set to "logic low". In these configurations, en_TX_ODT_P 192 and en_TX_ODT_N 193 may be set for a target VOCM, as may vary from application-to-application.

For a StrongHi configuration 295, data inputs 17 and 18 are both polarity 1, and a positive-side VMTX 100-1 selectively outputs DCI_StrongHi_P<M:0> code 175 and tie_lo code 246 for application to gates of positive-side transistors 265 and 266, respectively, and a negative-side VMTX 100-2 selectively outputs DCI_StrongLo_P<M:0> code 172 and DCI_StrongLo_N<M:0> code 182 for application to gates of negative-side transistors 265 and 266, respectively. For a WeakHi configuration 296, data inputs 17 and 18 respectively are polarity 1 and 0, and a positive-side VMTX 100-1 selectively outputs DCI_WeakHi_P<M:0> code 174 and DCI_WeakHi_N<M:0> code 184 for application to gates of positive-side transistors 265 and 266, respectively, and a negative-side VMTX 100-2 selectively outputs DCI_WeakLo_P<M:0> code 173 and DCI_WeakLo_N<M:0> code 183 for application to gates of negative-side transistors 265 and 266, respectively.

For a StrongLo configuration 297, data inputs 17 and 18 are both polarity 0, and a positive-side VMTX 100-1 selectively outputs DCI_StrongLo_P<M:0> code 172 and DCI_StrongLo_N<M:0> code 182 for application to gates of positive-side transistors 265 and 266, respectively, and a negative-side VMTX 100-2 selectively outputs DCI_StrongHi_P<M:0> code 175 and tie_lo code 246 for application to gates of negative-side transistors 265 and 266, respectively. For a WeakLo configuration 298, data inputs 17 and 18 respectively are polarity 0 and 1, and a positive-side VMTX 100-1 selectively outputs DCI_WeakLo_P<M:0> code 173 and DCI_WeakLo_N<M:0> code 183 for application to gates of positive-side transistors 265 and 266, respectively, and a negative-side VMTX 100-2 selectively outputs DCI_WeakHi_P<M:0> code 174 and DCI_WeakHi_N<M:0> code 184 for application to gates of negative-side transistors 265 and 266, respectively.

Figure 14:
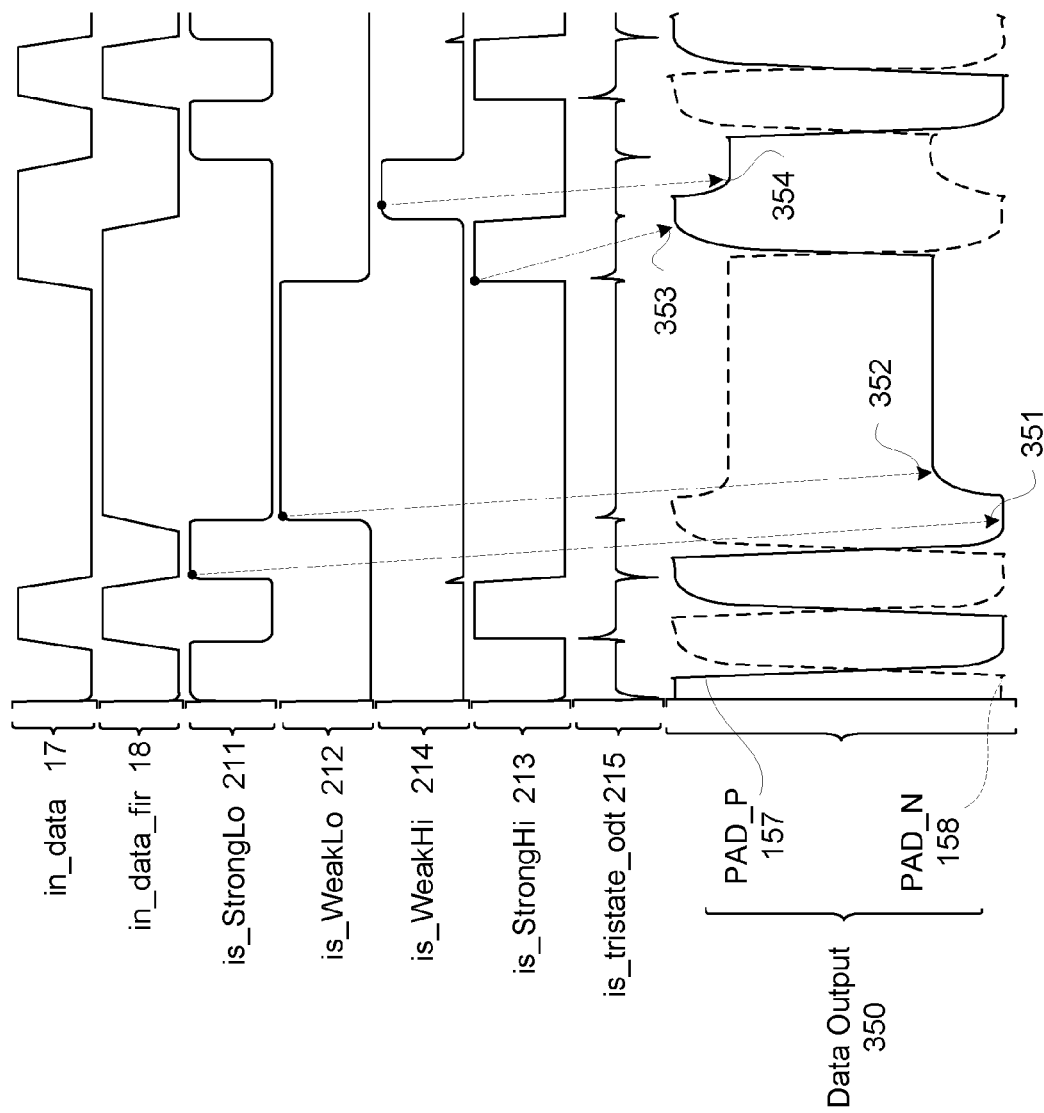
FIG. 14 is a signal diagram illustratively depicting exemplary simulated waveforms for signals of VMTXs of FIG. 3 configured as a differential TX with FIR equalization.

FIG. 14 is a signal diagram illustratively depicting exemplary simulated waveforms for signals of VMTXs 100-1 and 100-2 configured as a differential TX with FIR equalization. Arrow 353 is to indicate that for is_StrongHi 213 being asserted, a generally highest signal level in differential data output 350, formed of voltages on pads 157 and 158, may be obtained. Arrow 354 is to indicate that for is_WeakHi 214 being asserted, an intermediary high signal level in data output 350 may be obtained. Arrow 351 is to indicate that for is_StrongLo 211 being asserted, a generally lowest signal level in data output 350 may be obtained. Arrow 352 is to indicate that for is_WeakLo 212 being asserted, an intermediary low signal level in data output 350. In these examples, is_tristate_odt 215 is not asserted.

Returning to FIG. 3, by merging TX and DCI circuitry in a functional block in a lower supply voltage domain than DCI circuitry was previously implemented, power consumption may be reduced by operating both TX and DCI circuitry in such lower level supply voltage domain. Moreover, VMTX area may be reduced by such merger. Furthermore, by having both TX and DCI circuitry implemented with core devices, advantages associated with semiconductor process technology scaling and/or voltage scaling as semiconductor process technology advances may more readily be implemented. Additionally, as DCI circuitry changes drive strength dynamically responsive to polarity of incoming data to implement TX with FIR equalization by selection of DCI codes for driver circuitry, having separate main and post-cursor drivers or partitioning thereof in a VMTX may be avoided. This absence of partitioning of main-cursor and post-cursor drivers may provide enhanced granularity on an equalization level without increasing circuitry area. Furthermore, in an IOB pair, a dedicated current mode differential driver may be omitted in place of multi-leg VMTXs. Avoiding having such a dedicated current mode differential driver reduces IOB area and may reduce total pad capacitance per IOB.

Because one or more of the examples described herein may be implemented in an FPGA, a detailed description of such an IC is provided. However, it should be understood that other types of ICs may benefit from the technology described herein.

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. As used herein, "include" and "including" mean including without limitation.

Each programmable tile typically includes both programmable interconnect and programmable logic. The programmable interconnect typically includes a large number of interconnect lines of varying lengths interconnected by programmable interconnect points ("PIPs"). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of PLD is the Complex Programmable Logic Device, or CPLD. A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. In CPLDs, configuration data is typically stored on-chip in non-volatile memory. In some CPLDs, configuration data is stored on-chip in non-volatile memory, then downloaded to volatile memory as part of an initial configuration (programming) sequence.

For all of these programmable logic devices ("PLDs"), the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

Figure 15:
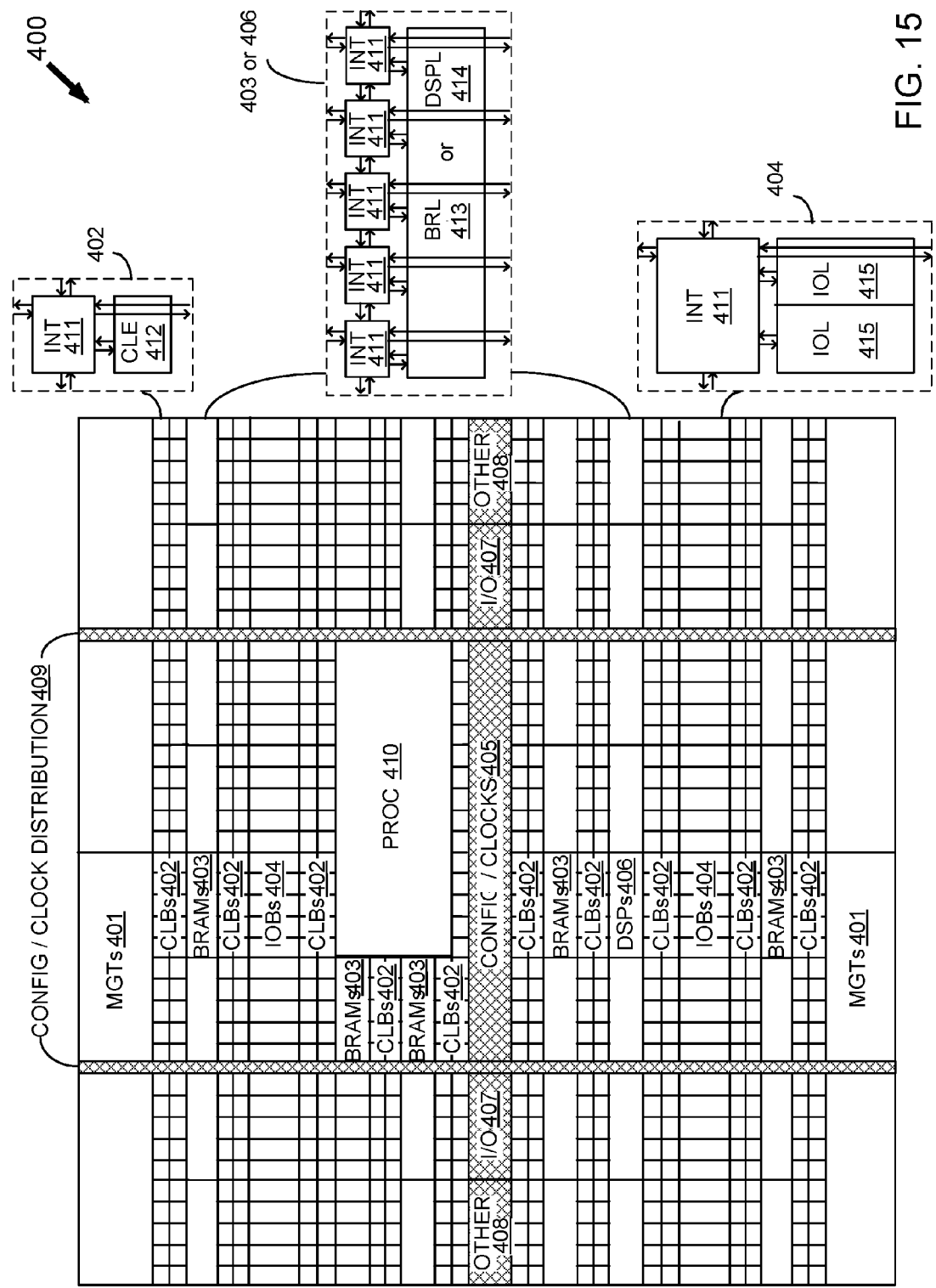
FIG. 15 is a simplified block diagram illustratively depicting an exemplary columnar Field Programmable Gate Array ("FPGA") architecture.

As noted above, advanced FPGAs can include several different types of programmable logic blocks in the array. For example, FIG. 15 illustrates an FPGA architecture 400 that includes a large number of different programmable tiles including multi-gigabit transceivers ("MGTs") 401, configurable logic blocks ("CLBs") 402, random access memory blocks ("BRAMs") 403, input/output blocks ("IOBs") 404, configuration and clocking logic ("CONFIG/CLOCKS") 405, digital signal processing blocks ("DSPs") 406, specialized input/output blocks ("I/O") 407 (e.g., configuration ports and clock ports), and other programmable logic 408 such as digital clock managers, analog-to-digital converters, system monitoring logic, and so forth. Some FPGAs also include dedicated processor blocks ("PROC") 410.

In some FPGAs, each programmable tile includes a programmable interconnect element ("INT") 411 having standardized connections to and from a corresponding interconnect element in each adjacent tile. Therefore, the programmable interconnect elements taken together implement the programmable interconnect structure for the illustrated FPGA. The programmable interconnect element 411 also includes the connections to and from the programmable logic element within the same tile, as shown by the examples included at the top of FIG. 15.

For example, a CLB 402 can include a configurable logic element ("CLE") 412 that can be programmed to implement user logic plus a single programmable interconnect element ("INT") 411. A BRAM 403 can include a BRAM logic element ("BRL") 413 in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 406 can include a DSP logic element ("DSPL") 414 in addition to an appropriate number of programmable interconnect elements. An IOB 404 can include, for example, two instances of an input/output logic element ("IOL") 415 in addition to one instance of the programmable interconnect element 411. As will be clear to those of skill in the art, the actual I/O pads connected, for example, to the I/O logic element 415 typically are not confined to the area of the input/output logic element 415.

In the pictured embodiment, a horizontal area near the center of the die (shown in FIG. 15) is used for configuration, clock, and other control logic. Vertical columns 409 extending from this horizontal area or column are used to distribute the clocks and configuration signals across the breadth of the FPGA.

Some FPGAs utilizing the architecture illustrated in FIG. 15 include additional logic blocks that disrupt the regular columnar structure making up a large part of the FPGA. The additional logic blocks can be programmable blocks and/or dedicated logic. For example, processor block 410 spans several columns of CLBs and BRAMs.

Note that FIG. 15 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 15 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

While the foregoing describes exemplary apparatus(es) and/or method(s), other and further examples in accordance with the one or more aspects described herein may be devised without departing from the scope hereof, which is determined by the claims that follow and equivalents thereof. Claims listing steps do not imply any order of the steps. Trademarks are the property of their respective owners.

What is claimed is:

1. An apparatus for a transmitter, comprising:
a decoder configured to receive a data input and control signals and to generate state signals responsive to a control signal of the control signals and data polarity of the data input; and
select circuitry configured to receive coded signals to replace the data input with a pull-up code and a pull-down code of the coded signals responsive to the state signals and the control signals for propagation of the pull-up code and the pull-down code in place of the data input.

2. The apparatus according to claim 1, wherein the data input includes a first data input and a second data input, and wherein the select circuitry comprises:
   first select circuits configured to receive pull-up coded signals of the coded signals, a first subset of the control signals, and the state signals and to selectively output the pull-up code of the pull-up coded signals responsive to the first subset of the control signals and the state signals; and
   second select circuits configured to receive pull-down coded signals of the coded signals, a second subset of the control signals, and the state signals and to selectively output the pull-down code of the pull-down coded signals responsive to the second subset of the control signals and the state signals.

3. The apparatus according to claim 2, wherein the second data input is a delayed and inverted version of the first data input, the second data input being delayed one unit interval with respect to the first data input.

4. The apparatus according to claim 2, the apparatus further comprising a driver circuit configured to receive the pull-up code and the pull-down code and to generate drive strength dynamically responsive to the pull-up code and the pull-down code.

5. The apparatus according to claim 4, wherein the control signals include a voltage mode transmission activation signal, a finite impulse response activation signal, a driver suspension signal, a positive-side receiver on-die termination activation signal, a negative-side receiver on-die termination activation signal, a positive-side transmitter on-die termination activation signal, and a negative-side transmitter on-die termination activation signal.

6. The apparatus according to claim 5, wherein:
   the driver suspension signal, the finite impulse response activation signal, and polarities of data pairs of the first data input and the second data input are for generation of the state signals;
   the pull-up coded signals include a first strong-low code, a first strong-high code, a first weak-low code, a first weak-high code, and a first receiver-side on-die termination code; and
   the pull-down coded signals include a second strong-low code, a second strong-high code, a second weak-low code, a second weak-high code, and a second receiver-side on-die termination code.

7. An apparatus for a transmitter, comprising:
   a digitally-controlled impedance control circuit configured to receive data pairs and control information with coded signals and configured to generate state signals responsive to the data pairs and the control information;
   wherein the coded signals are associated with the data pairs;
   the digitally-controlled impedance control circuit configured to selectively output an internal pull-up code and an internal pull-down code from the coded signals;
   a level shifter circuit configured to level-shift the internal pull-up code and the internal pull-down code;
   a pre-driver circuit configured to buffer the internal pull-up code and the internal pull-down code; and
   a driver circuit configured to dynamically generate drive strength responsive to the internal pull-up code and the internal pull-down code.

8. The apparatus according to claim 7, wherein:
   the data pairs comprise a first data input and a second data input;
   the control information comprises control signals;
   the coded signals comprise first coded signals for pull-up legs and second coded signals for pull-down legs;
   the state signals are generated responsive to the first data input, the second data input, and a subset of the control signals; and
   the digitally-controlled impedance control circuit is configured to selectively output the internal pull-up code and the internal pull-down code respectively from the first coded signals and the second coded signals.

9. The apparatus according to claim 8, wherein the subset of the control signals is a first subset of the control signals, and wherein the digitally-controlled impedance control circuit comprises:
   a decoder configured to receive the first data input, the second data input, and the first subset of the control signals and to generate the state signals responsive to polarities of the first data input and the second data input and responsive to the first subset of the control signals;
   first code select circuits configured to receive the first coded signals, a second subset of the control signals, and the state signals and to selectively output the internal pull-up code responsive to the state signals and the second subset of the control signals; and
   second code select circuits configured to receive the second coded signals, a third subset of the control signals, and the state signals and to selectively output the internal pull-down code responsive to the state signals and the third subset of the control signals.

10. The apparatus according to claim 8, wherein:
    the second data input is a delayed and inverted version of the first data input, the second data input being delayed at least approximately one unit interval with respect to the first data input; and
    the data pairs include data polarities of 00, 10, 01, and 11 respectively for the first data input and the second data input.

11. The apparatus according to claim 8, wherein the control signals include a voltage mode transmission activation signal, a finite impulse response activation signal, a driver suspension signal, a positive-side receiver on-die termination activation signal, a negative-side receiver on-die termination activation signal, a positive-side transmitter on-die termination activation signal, and a negative-side transmitter on-die termination activation signal.

12. The apparatus according to claim 11, wherein:
    the subset of the control signals include the driver suspension signal and the finite impulse response activation signal;
    the first coded signals include a first strong-low code, a first strong-high code, a first weak-low code, a first weak-high code, and a first receiver-side on-die termination code; and
    the second coded signals include a second strong-low code, a second strong-high code, a second weak-low code, a second weak-high code, and a second receiver-side on-die termination code.

13. The apparatus according to claim 7, wherein the transmitter is a multi-leg voltage mode transmitter without a post-cursor driver.

14. The apparatus according to claim 7, wherein the transmitter is a multi-leg voltage mode transmitter without a preset drive strength for a main-cursor driver.

15. The apparatus according to claim 7, wherein:
    the level shifter circuit is configured to receive the internal pull-up code and the internal pull-down code and to shift voltage of the internal pull-up code and the internal pull-down code from an internal input-output level up to an output voltage level to provide a voltage-shifted pull-up code and a voltage-shifted pull-down code;

the pre-driver circuit is configured to receive the voltage-shifted pull-up code and the voltage-shifted pull-down code and to buffer the voltage-shifted pull-up code and the voltage-shifted pull-down code for the output voltage level to provide a buffered pull-up code and a buffered pull-down code, respectively;

the driver circuit is configured to receive the buffered pull-up code and the buffered pull-down code and to generate the drive strength dynamically responsive to the buffered pull-up code and the buffered pull-down code to drive a data output;

wherein the digitally-controlled impedance circuit and the driver circuit provide finite impulse response equalization; and wherein the driver circuit is configured responsive to the buffered pull-up code and the buffered pull-down code to generate the drive strength dynamically responsive to data polarities of the data pairs to provide finite impulse response equalization.

16. A method for transmission, comprising:

receiving a first data input, a second data input, and control signals by a decoder;

receiving first coded signals by first select circuits;

receiving second coded signals by second select circuits;

generating state signals by the decoder responsive to the first data input, the second data input, and at least one of the control signals; and selectively outputting of an internal pull-up code of the first coded signals and an internal pull-down code of the second coded signals responsive to the control signals and the state signals.

17. The method according to claim 16, wherein the selectively outputting comprises:

first selectively outputting from the first select circuits the internal pull-up code from the first coded signals responsive to the state signals and a first subset of the control signals; and second selectively outputting from the second select circuits the internal pull-down code from the second coded signals responsive to the state signals and a second subset of the control signals.

18. The method according to claim 17, wherein:

the control signals include a voltage mode transmission activation signal, a finite impulse response activation signal, a driver suspension signal, a positive-side receiver on-die termination activation signal, a negative-side receiver on-die termination activation signal, a positive-side transmitter on-die termination activation signal, and a negative-side transmitter on-die termination activation signal;

the subset of the control signals includes the driver suspension signal and the finite impulse response activation signal;

the first coded signals include a first strong-low code, a first strong-high code, a first weak-low code, a first weak-high code, and a first receiver-side on-die termination code; and the second coded signals include a second strong-low code, a second strong-high code, a second weak-low code, a second weak-high code, and a second receiver-side on-die termination code.

19. The method according to claim 16, the method further comprising:

obtaining a version of each of the internal pull-up code and the internal pull-down code by a driver circuit; and dynamically generating drive strength by the driver circuit responsive to the first data input and the second data input associated with the internal pull-up code and the internal pull-down code.

20. The method according to claim 19, further comprising:

receiving the internal pull-up code and the internal pull-down code by a level shifter circuit;

shifting voltage of the internal pull-up code and the internal pull-down code from an internal input-output level up to an output voltage level by the level shifter circuit to provide a voltage-shifted pull-up code and a voltage-shifted pull-down code;

receiving the voltage-shifted pull-up code and the voltage-shifted pull-down code by a pre-driver circuit;

buffering the voltage-shifted pull-up code and the voltage-shifted pull-down code for the output voltage level with the pre-driver circuit to provide a buffered pull-up code and a buffered pull-down code;

receiving the buffered pull-up code and the buffered pull-down code by the driver circuit;

driving at least one leg circuit of the driver circuit responsive to the buffered pull-up code and the buffered pull-down code to provide a data output;

wherein the driving comprises dynamically generating drive strength by the driver circuit responsive to data polarity of the first data input and the second data input to provide the internal pull-up code and the internal pull-down code; and wherein the driver circuit provides finite impulse response equalization with the driving of the at least one leg circuit.

* * * * *